(12) United States Patent
Decoster et al.

(10) Patent No.: US 11,426,691 B2
(45) Date of Patent: Aug. 30, 2022

(54) FILTER ELEMENTS, AIR CLEANER ASSEMBLIES, AND METHODS OF USE AND ASSEMBLY

(71) Applicant: Donaldson Company, Inc., Minneapolis, MN (US)

(72) Inventors: Kristof Decoster, Vilvoorde (BE); Johnny Craessaerts, Sint-agatha-rode (BE); Mathijs Verstraete, Tienen (BE)

(73) Assignee: Donaldson Company, Inc., Bloomington, MN (US)

( * ) Notice: Subject to any disclaimer, the term of this patent is extended or adjusted under 35 U.S.C. 154(b) by 110 days.

(21) Appl. No.: 16/347,402

(22) PCT Filed: Nov. 3, 2017

(86) PCT No.: PCT/US2017/060015
§ 371 (c)(1),
(2) Date: May 3, 2019

(87) PCT Pub. No.: WO2018/111434
PCT Pub. Date: Jun. 21, 2018

(65) Prior Publication Data
US 2019/0299143 A1    Oct. 3, 2019

Related U.S. Application Data

(60) Provisional application No. 62/417,722, filed on Nov. 4, 2016.

(51) Int. Cl.
*B01D 46/00* (2022.01)
*B01D 46/24* (2006.01)
(Continued)

(52) U.S. Cl.
CPC ...... *B01D 46/2414* (2013.01); *B01D 46/2411* (2013.01); *B01D 46/64* (2022.01);
(Continued)

(58) Field of Classification Search
CPC ............ B01D 46/2414; B01D 46/0024; B01D 2265/024; B01D 2265/025;
(Continued)

(56) References Cited

U.S. PATENT DOCUMENTS 4,925,561 A    5/1990 Ishii et al.
5,049,326 A    9/1991 Matsumoto et al.
(Continued)

FOREIGN PATENT DOCUMENTS

DE            38 06 208 A1    9/1989
DE    20 2008 017 059 U1    6/2010
(Continued)

OTHER PUBLICATIONS

International Search Report and Written Opinion for Application No. PCT/US2017/060015 dated Jul. 30, 2018.
(Continued)

*Primary Examiner* — T. Bennett McKenzie
*Assistant Examiner* — Qianping He
(74) *Attorney, Agent, or Firm* — Merchant & Gould P.C.

(57) ABSTRACT

Air cleaner assemblies, components, and features are described. The features can be used to provide that the air cleaner assembly includes a housing and cover within which primary and secondary filter cartridges, having a media pack and a seal arrangement surrounding the media pack, can be installed. The filter cartridges can include an open end cap with an axially deviating seal arrangement and a plurality of axially extending channels for engaging with ribs on the housing. The filter cartridges can also include extension members extending from the open end cap that include the axially extending channels, entirely or partially. The filter cartridges can also include a guide member extending from the extension members for providing a low friction surface against the housing during installation that allows axial force (Continued)

exerted by the installer to be translated into a rotational force that rotates the filter cartridge during installation.

15 Claims, 32 Drawing Sheets

(51) Int. Cl.
  *F02M 35/02* (2006.01)
  *F02M 35/024* (2006.01)
  *B01D 46/64* (2022.01)
(52) U.S. Cl.
  CPC .. *F02M 35/0214* (2013.01); *F02M 35/02416* (2013.01); *B01D 2265/024* (2013.01); *B01D 2265/025* (2013.01); *B01D 2265/026* (2013.01); *B01D 2265/027* (2013.01); *B01D 2271/027* (2013.01); *B01D 2279/60* (2013.01)
(58) Field of Classification Search
  CPC ........ B01D 2265/026; B01D 2265/027; B01D 2279/60; B01D 2201/4076; B01D 2201/4061; B01D 2201/4053; B01D 2201/29–298; B01D 2271/00–027; B01D 27/005; B01D 27/08; B01D 27/10; B01D 27/103; B01D 2201/291; B01D 46/0004; B01D 46/0005–0009; B01D 46/002–0026; B01D 46/2411–2414; B01D 2201/295; B01D 2201/4046–4061; B01D 2265/02–029; F02M 35/0214; F02M 35/02416
  USPC ............ 55/502, 385.3, 458, 459.1, 490–519, 55/341.1–341.7
  See application file for complete search history.

(56) References Cited

U.S. PATENT DOCUMENTS

| | | | |
|---|---|---|---|
| 5,472,463 | A | 12/1995 | Herman et al. |
| 5,525,226 | A | 6/1996 | Brown et al. |
| 5,562,825 | A | 10/1996 | Yamada et al. |
| 5,613,992 | A | 3/1997 | Engel |
| 5,738,785 | A | 4/1998 | Brown et al. |
| 5,772,883 | A | 6/1998 | Rothman et al. |
| D396,098 | S | 7/1998 | Gillingham et al. |
| 5,792,247 | A | 8/1998 | Gillingham et al. |
| D398,046 | S | 9/1998 | Gillingham et al. |
| D399,944 | S | 10/1998 | Gillingham et al. |
| 5,820,646 | A | 10/1998 | Gillingham et al. |
| 5,895,574 | A | 4/1999 | Friedmann et al. |
| 5,902,364 | A | 5/1999 | Tokar et al. |
| 6,039,778 | A | 3/2000 | Coulonvaux |
| D428,128 | S | 7/2000 | Gillingham et al. |
| 6,179,890 | B1 | 1/2001 | Ramos et al. |
| D437,401 | S | 2/2001 | Ramos et al. |
| 6,190,432 | B1 | 2/2001 | Gieseke et al. |
| 6,210,469 | B1 | 4/2001 | Tokar |
| 6,235,195 | B1 | 5/2001 | Tokar |
| 6,350,296 | B1 | 2/2002 | Warner |
| 6,419,718 | B1 | 7/2002 | Klug et al. |
| 6,482,247 | B2 | 11/2002 | Jaroszczyk et al. |
| 6,673,136 | B2 | 1/2004 | Gillingham et al. |
| 6,936,084 | B2 | 8/2005 | Schlensker et al. |
| 6,949,189 | B2 | 9/2005 | Bassett et al. |
| 7,311,748 | B2 | 12/2007 | Holmes et al. |
| 7,351,270 | B2 | 4/2008 | Engelland et al. |
| 7,494,017 | B2 | 2/2009 | Miller |
| 7,625,419 | B2 | 12/2009 | Nelson et al. |
| 7,708,953 | B2 | 5/2010 | Cremeens et al. |
| 7,967,886 | B2 | 6/2011 | Schrage et al. |
| 8,034,145 | B2 | 10/2011 | Boehrs et al. |
| 8,061,530 | B2 | 11/2011 | Kindkeppel et al. |
| 8,097,061 | B2 | 1/2012 | Smith et al. |
| 8,152,876 | B2 | 4/2012 | Gillenberg et al. |
| 8,202,419 | B2 | 6/2012 | Wallerstorfer et al. |
| 8,246,702 | B2 | 8/2012 | Ackermann et al. |
| 8,349,049 | B2 | 1/2013 | Amesöder et al. |
| 8,361,181 | B2 | 1/2013 | Osendorf et al. |
| RE44,424 | E | 8/2013 | Barnwell |
| 8,778,044 | B2 | 7/2014 | Amesoeder et al. |
| 8,864,866 | B2 | 10/2014 | Osendorf et al. |
| 8,916,044 | B2 | 12/2014 | Rapin |
| 9,114,346 | B2 | 8/2015 | Schrage et al. |
| 9,120,047 | B2 | 9/2015 | Boehrs et al. |
| 9,180,399 | B2 | 11/2015 | Reichter et al. |
| 9,320,997 | B2 | 4/2016 | Campbell et al. |
| 9,346,001 | B2 | 5/2016 | Kato et al. |
| 9,346,002 | B2 | 5/2016 | Kleynen |
| 10,029,198 | B2 | 7/2018 | Adamek et al. |
| 10,357,732 | B2 | 7/2019 | Rieger et al. |
| 10,835,852 | B2 | 11/2020 | Decoster et al. |
| 2004/0187689 | A1 | 9/2004 | Sporre et al. |
| 2005/0130508 | A1 | 6/2005 | Yeh |
| 2006/0037296 | A1* | 2/2006 | Duffy ................ B01D 46/0001 55/495 |
| 2008/0041026 | A1 | 2/2008 | Engel et al. |
| 2008/0142426 | A1 | 6/2008 | Greco et al. |
| 2008/0282890 | A1 | 11/2008 | Rocklitz et al. |
| 2009/0127211 | A1 | 5/2009 | Rocklitz et al. |
| 2009/0230051 | A1 | 9/2009 | Holmes et al. |
| 2010/0032365 | A1 | 2/2010 | Moe et al. |
| 2010/0064646 | A1 | 3/2010 | Smith et al. |
| 2012/0067014 | A1* | 3/2012 | Dhiman ............... B01D 46/008 55/399 |
| 2013/0000267 | A1 | 1/2013 | Merritt |
| 2013/0062270 | A1* | 3/2013 | Braunheim ......... B01D 36/003 210/236 |
| 2014/0102060 | A1* | 4/2014 | Kato .................. B01D 46/0002 55/502 |
| 2014/0165834 | A1* | 6/2014 | Kaufmann ....... F02M 35/02416 95/273 |
| 2014/0208705 | A1 | 7/2014 | Krull |
| 2014/0251895 | A1 | 9/2014 | Wagner |
| 2015/0096931 | A1* | 4/2015 | Jensen .................... F02M 37/32 210/437 |
| 2015/0101295 | A1* | 4/2015 | Thompson ............. B01D 29/58 55/482 |
| 2015/0306530 | A1 | 10/2015 | Reichter et al. |
| 2016/0059172 | A1 | 3/2016 | Allott et al. |
| 2016/0131094 | A1 | 5/2016 | Pereira Madeira et al. |
| 2017/0001134 | A1 | 1/2017 | Rieger et al. |
| 2017/0232374 | A1* | 8/2017 | Osendorf .......... B01D 46/0005 55/495 |
| 2017/0266601 | A1 | 9/2017 | Carter et al. |
| 2018/0318745 | A1* | 11/2018 | Nichols ............. B01D 46/2414 |
| 2018/0369735 | A1 | 12/2018 | Decoster et al. |
| 2020/0324237 | A1 | 10/2020 | Moers et al. |

FOREIGN PATENT DOCUMENTS

| | | |
|---|---|---|
| DE | 10 2016 002 954 A1 | 9/2016 |
| EP | 2774667 | 9/2014 |
| EP | 2 665 535 B1 | 4/2016 |
| JP | 4141226 B2 | 8/2008 |
| WO | 97/40918 A1 | 11/1997 |
| WO | 02/098540 A1 | 12/2002 |
| WO | 03/047722 A2 | 6/2003 |
| WO | 2004/007054 A1 | 1/2004 |
| WO | 2004/082795 A2 | 9/2004 |
| WO | 2005/077487 A1 | 8/2005 |
| WO | 2006/014941 A2 | 2/2006 |
| WO | 2006/026241 A1 | 3/2006 |
| WO | 2006/076456 A1 | 7/2006 |
| WO | 2006/076479 A1 | 7/2006 |
| WO | 2007/133635 A2 | 11/2007 |
| WO | 2009/014988 A1 | 1/2009 |
| WO | 2009/039285 A1 | 3/2009 |
| WO | 2010/033291 A1 | 3/2010 |
| WO | 2010/117799 A2 | 10/2010 |
| WO | 2013/063497 A2 | 5/2013 |
| WO | 2013/104792 A1 | 7/2013 |

(56) References Cited

FOREIGN PATENT DOCUMENTS

| WO | 2014/078796 A2 | 5/2014 |
|----|----------------|--------|
| WO | 2014/210541 A1 | 12/2014 |
| WO | 2015/010085 A2 | 1/2015 |
| WO | 2015/054397 A1 | 4/2015 |
| WO | 2016/077377 A1 | 5/2016 |
| WO | 2016/105560 A2 | 6/2016 |
| WO | 2017/079191 A1 | 5/2017 |
| WO | 2017106752 | 6/2017 |

OTHER PUBLICATIONS

European Examination Report for Application No. 17857682.3 dated May 7, 2020.
International Search Report and Written Opinion corresponding to PCT/US2018/062628 dated Apr. 30, 2019.

* cited by examiner

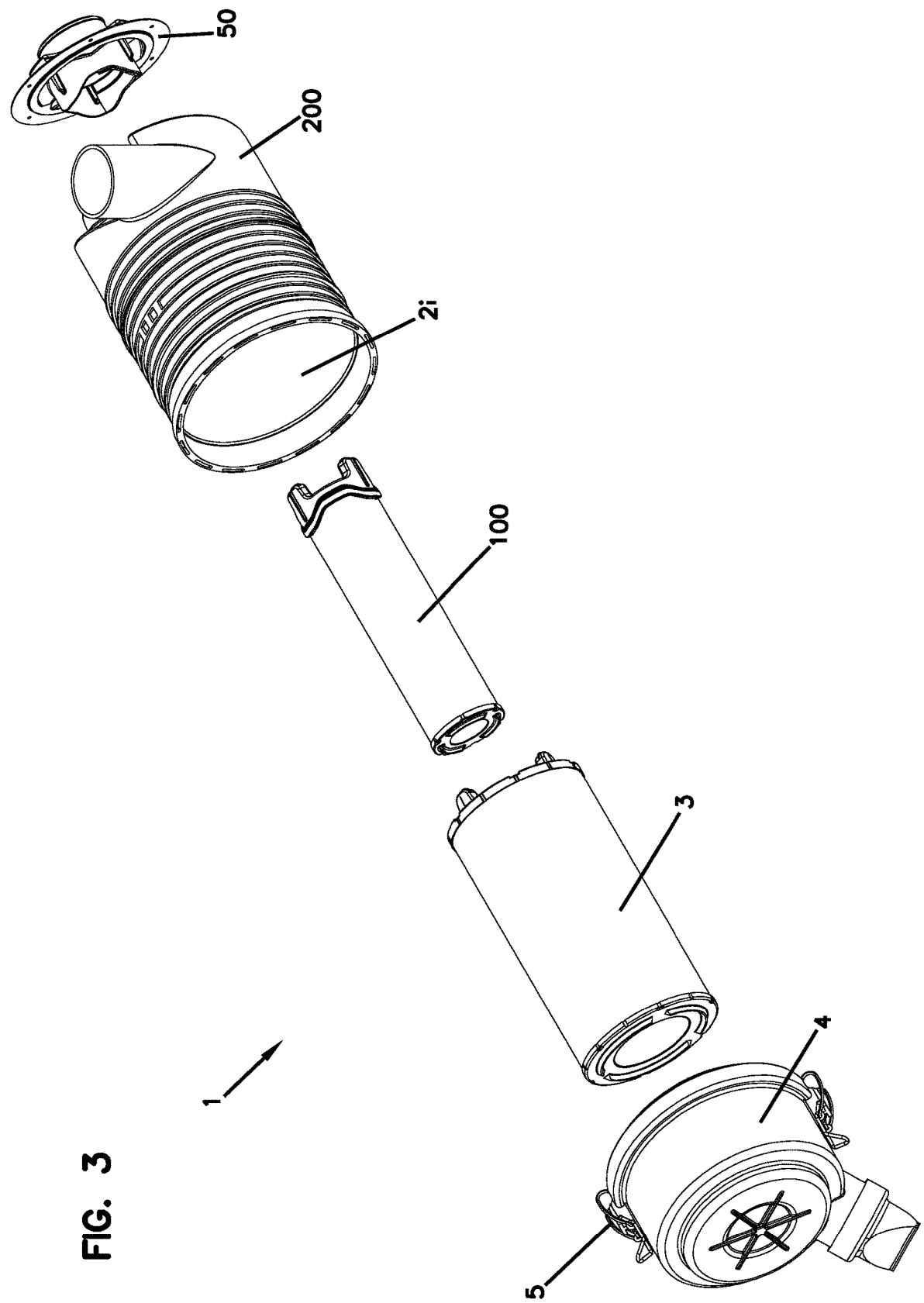

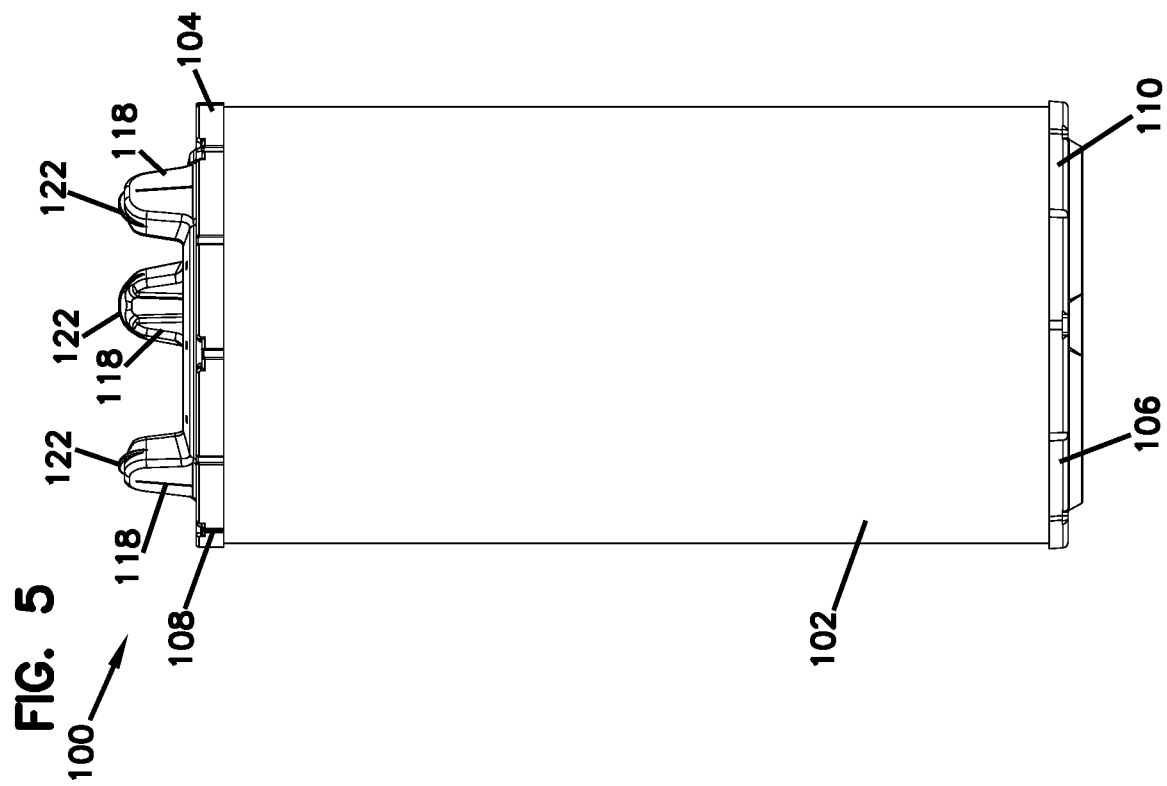
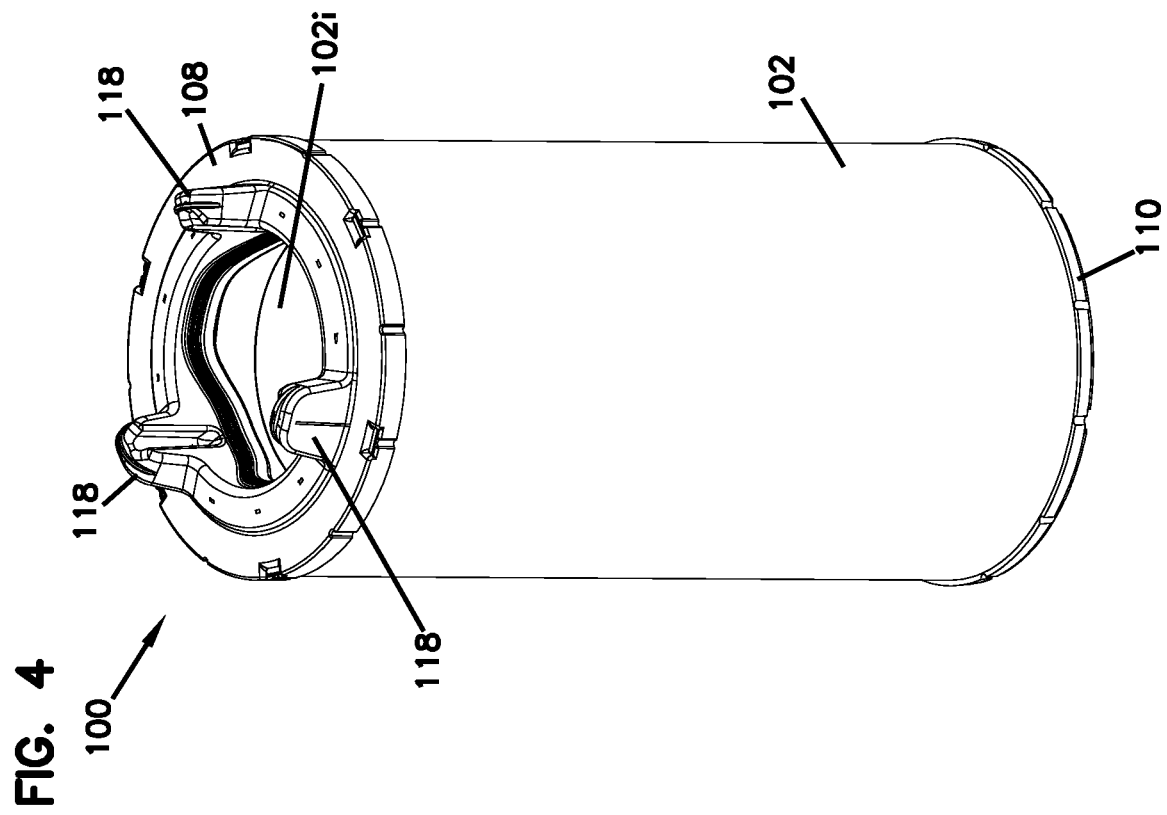

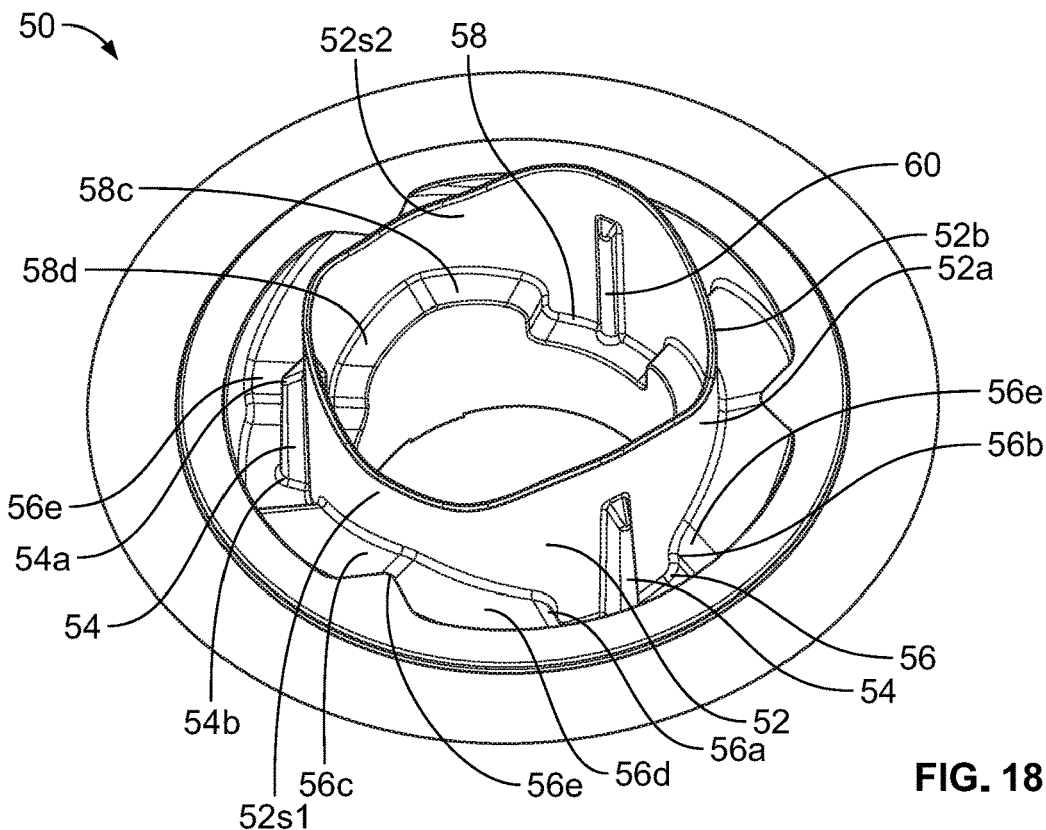
FIG. 18
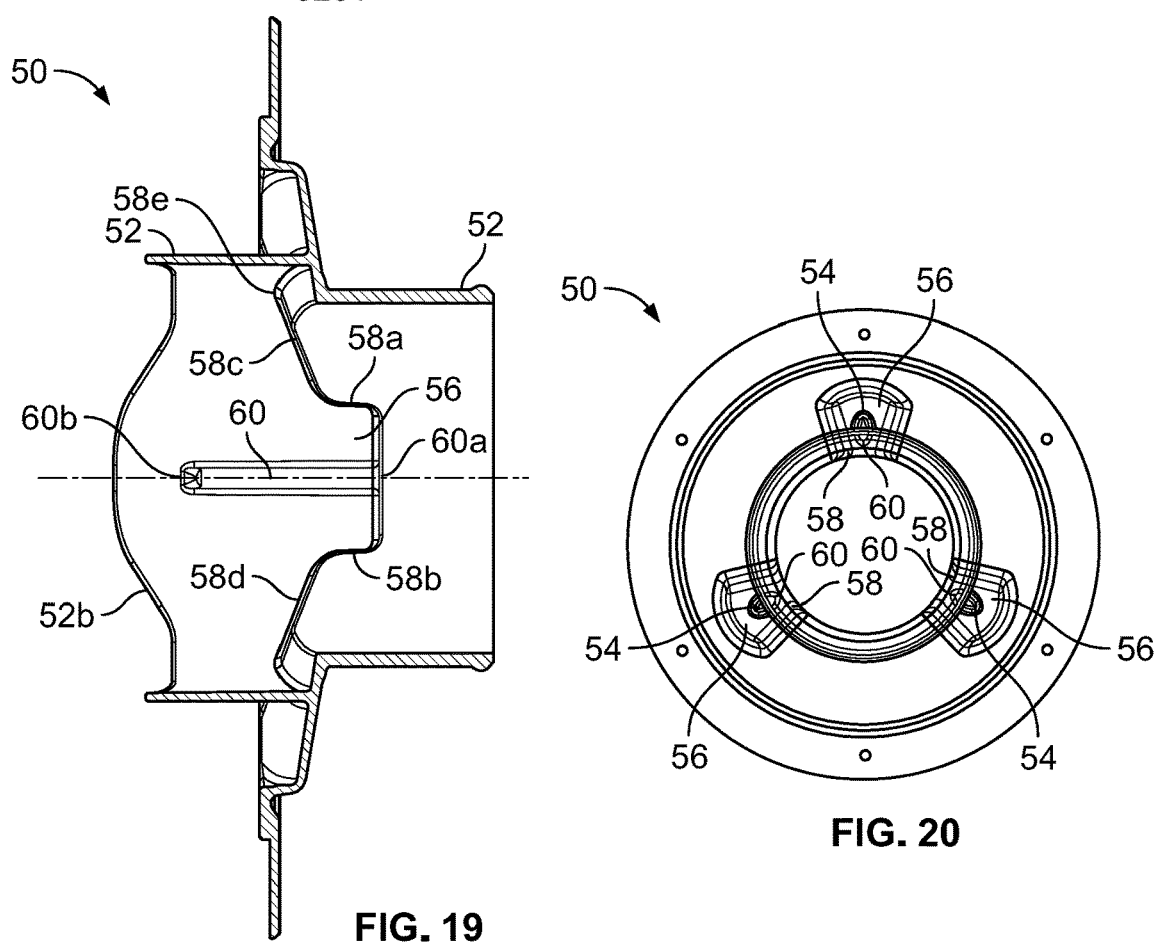
FIG. 19
FIG. 20

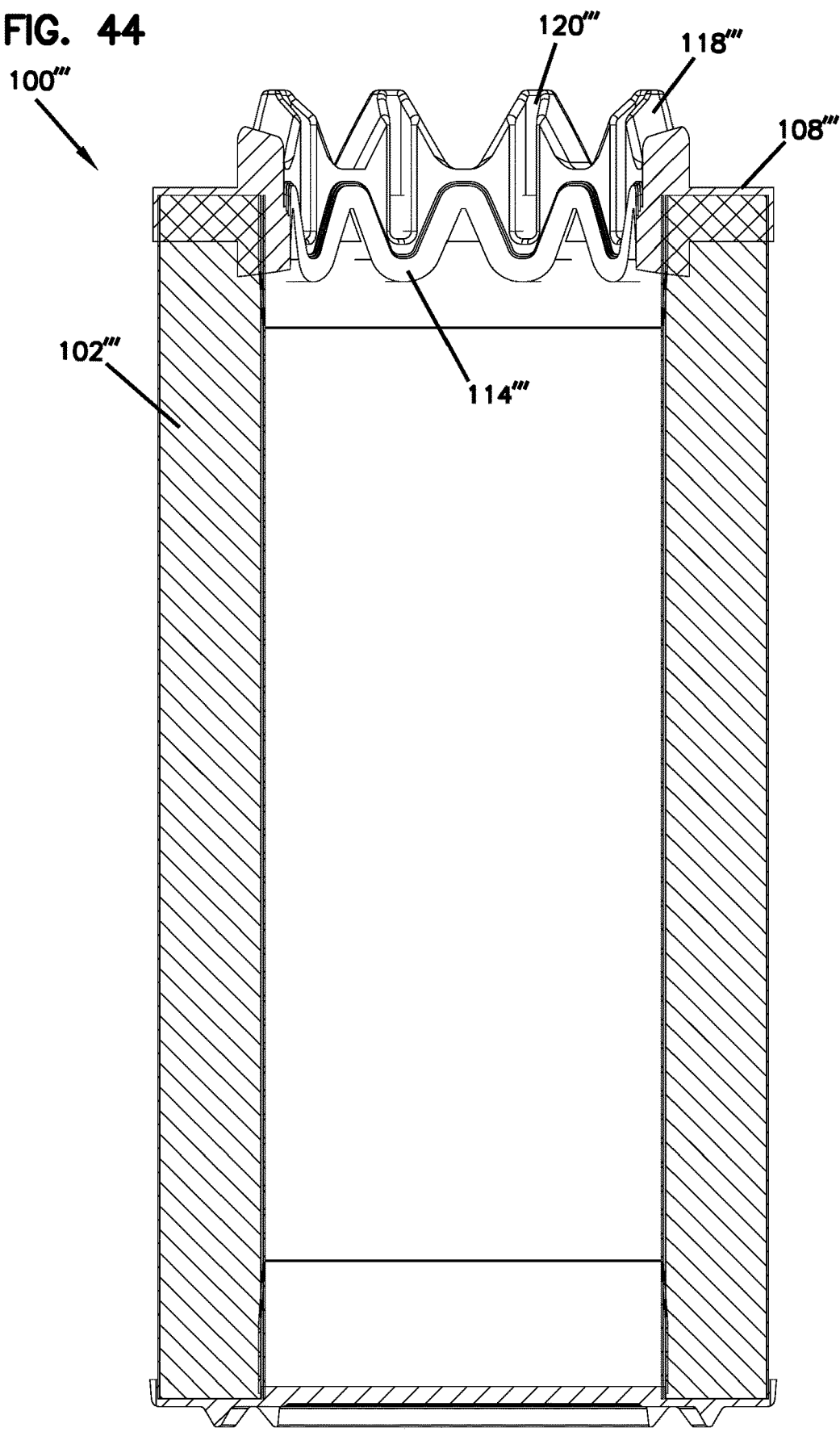

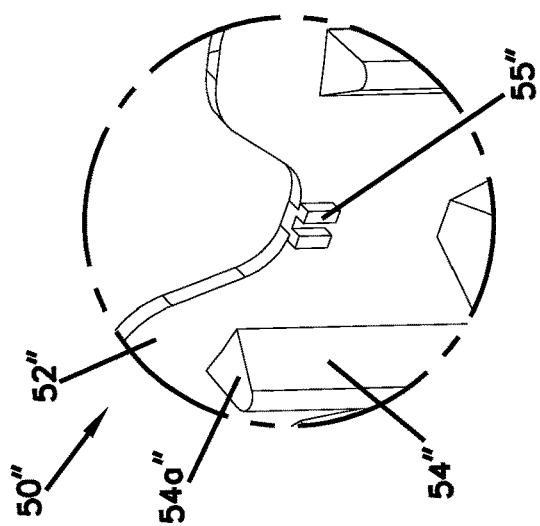
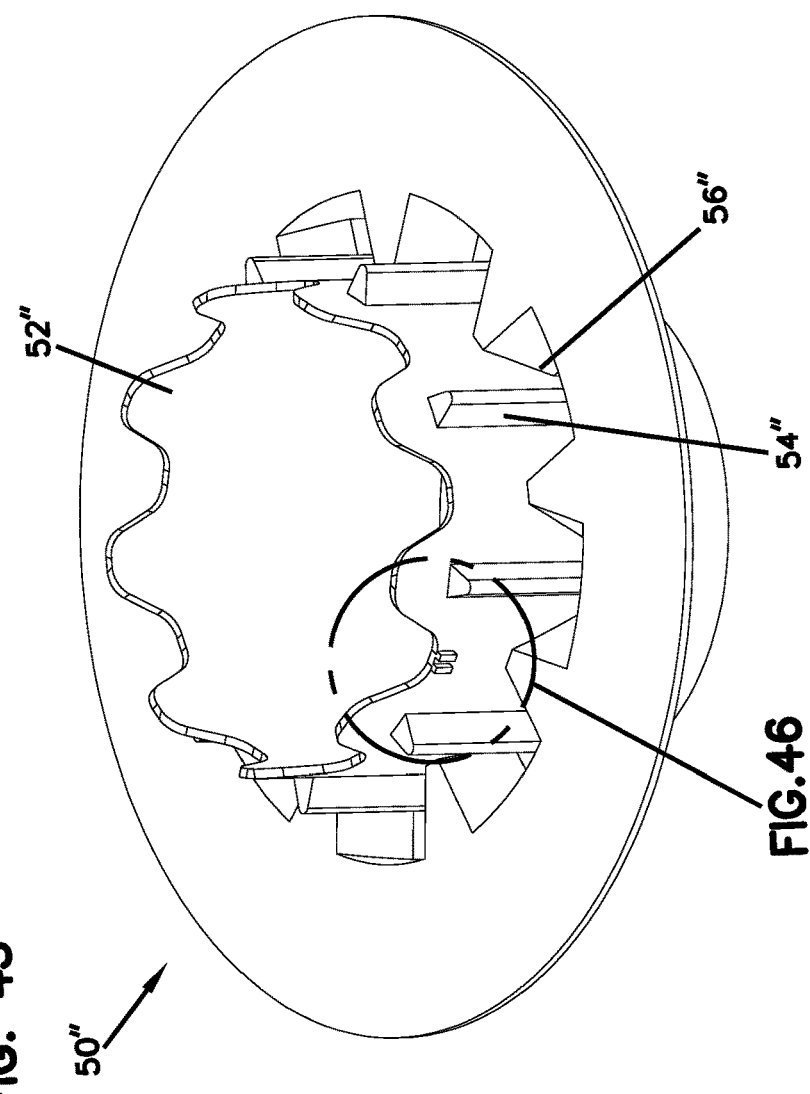

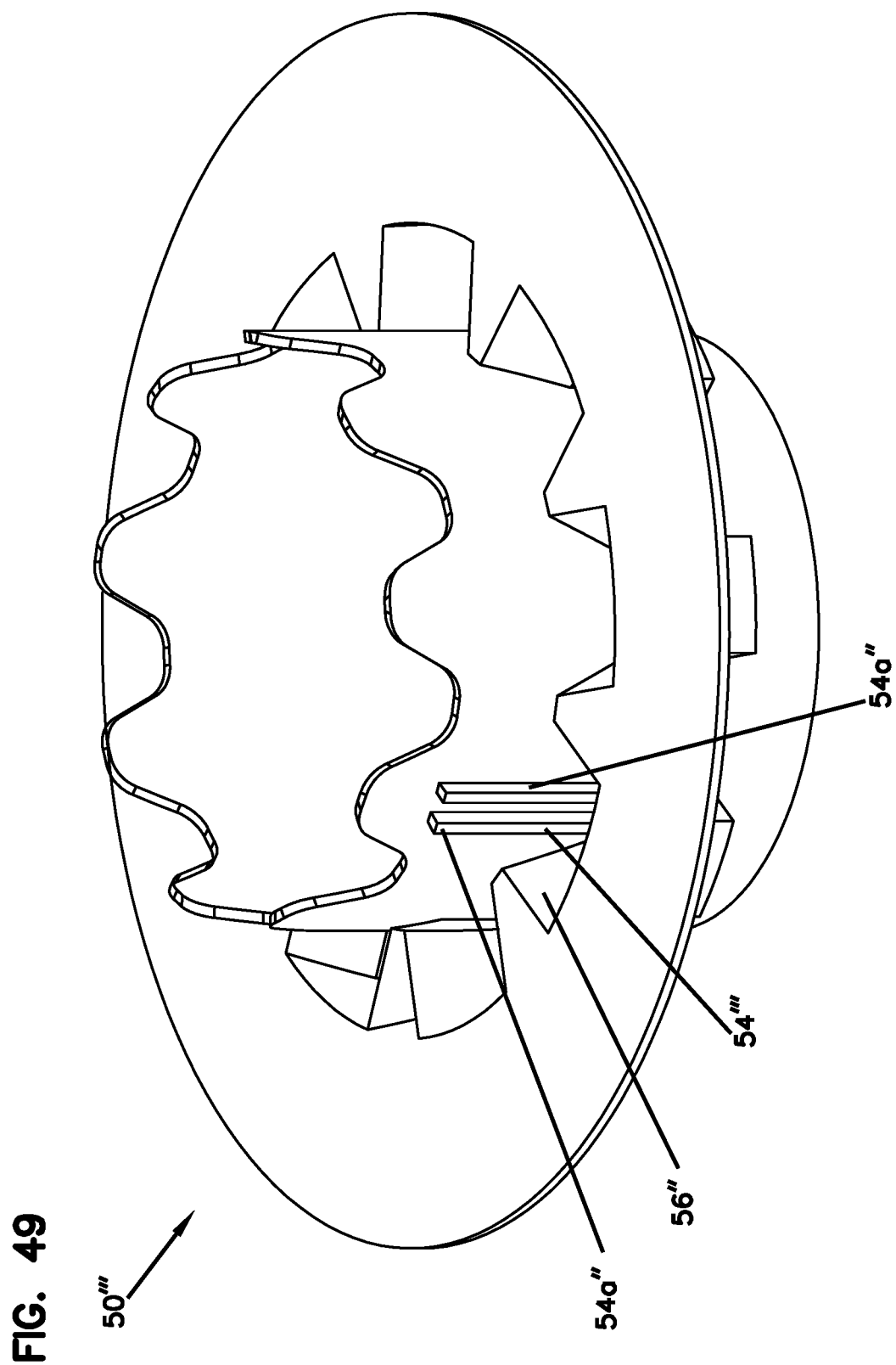

FILTER ELEMENTS, AIR CLEANER ASSEMBLIES, AND METHODS OF USE AND ASSEMBLY

RELATED APPLICATIONS

This application is a National Stage application of PCT International application No. PCT/US2017/060015, filed Nov. 3, 2017, which claims the benefit of priority to U.S. Provisional Patent Application Ser. No. 62/417,722, filed on Nov. 4, 2016, which applications are incorporated herein by reference. To the extent appropriate, a claim of priority is made to each of the above disclosed applications.

FIELD OF THE DISCLOSURE

The present disclosure relates to filter assemblies, for example air cleaner assemblies, and components and features thereof, and methods of assembly and use. The filter assemblies comprise a housing having a removable and replaceable filter cartridge therein. Various features of filter housings and/or the cartridges are described, which can provide for advantage. Methods of assembly and use are described.

BACKGROUND

Air or other gas filtering is desirable in a number of systems. A typical application is in the filtration of intake air to internal combustion engines. Another is in the filtration of crankcase ventilation filter assemblies. Typically, such systems comprise filter assemblies having a serviceable filter cartridge therein. After a period of use, filter media within a filter housing requires servicing, either through cleaning or complete replacement. Typically, for an air cleaner or crankcase ventilation filter assembly used with an internal combustion engine, for example on a vehicle, the filter media is contained in a removable and replaceable, i.e. serviceable, component, typically referred as a filter element or cartridge. The filter cartridge is configured to be removably sealed within the air cleaner, in use. Improvements in filter arrangements relating to assembly, serviceability, use are desirable. The filter cartridge can be provided as a primary filter cartridge or a secondary filter cartridge. The air cleaner assembly can contain only a primary filter cartridge or both a primary filter cartridge and a secondary filter cartridge.

SUMMARY

Filter assembly (such as air cleaner assemblies or crankcase ventilation filter assemblies) features and components are described. Also described are methods of assembly and use. The filter assemblies generally comprise a housing having a filter cartridge removably positioned therein.

An example assembly includes a first filter cartridge and a second filter cartridge, wherein the first filter cartridge has a first sealing structure configured for sealing against a portion of a housing and having a sealing surface, and wherein the second filter cartridge has a second sealing structure configured for sealing against the second filter cartridge sealing surface. In one embodiment, the first sealing structure is an outwardly directed radial seal while the second sealing structure is an inwardly directed radial seal.

Each of the first and second filter cartridges may be provided with features for ensuring proper alignment of the cartridges with respect to the housing and outlet cover. As each of the first and second filter cartridges is provided with an axially deviating seal structure, proper alignment is beneficial in ensuring that a proper seal is achieved. The filter cartridges can be provided with extension members that extend from an open end cap of the cartridges. In one example, the extension members are provided with axially extending, radial facing recesses that are received by corresponding ribs associated with the outlet cover. In one example, the extension members are provide with a guide member that provides a low friction surface with the outlet cover which enables for self-alignment of the filter cartridges. In one example, both such features are provided. Each of these features provides an installer with a tactile feedback that allows the user to feel whether the filter cartridge is properly aligned and inserted with respect to the housing outlet cover.

There is no specific requirement that an air cleaner assembly, component therefor, or feature thereof include all of the detail characterized herein, to obtain some advantage according to the present disclosure.

BRIEF DESCRIPTION OF THE DRAWINGS

FIG. 3 is an exploded view of the air cleaner assembly shown in FIG. 1, wherein a first filter cartridge, a second filter cartridge, and an outlet cover are shown as being utilized in conjunction with the housing assembly.

FIG. 4 is a perspective view of the first filter cartridge shown in FIG. 3.

FIG. 5 is a side view of the first filter cartridge shown in FIG. 4.

FIG. 18 is a perspective view of the outlet cover shown in FIG. 3.

FIG. 19 is a cross-sectional side view of the outlet cover shown in FIG. 18.

FIG. 20 is a bottom view of the outlet cover shown in FIG. 18.

FIG. 44 is a cross-sectional side view of the first filter cartridge shown in FIG. 41.

FIG. 45 is a perspective view of a third example of an outlet cover usable in with the air cleaner assembly of FIG. 1 and the filter cartridges shown in FIGS. 27, 28, 31, 32, and 41.

FIG. 46 is an enlarged view of a portion of the outlet cover shown in FIG. 45.

FIG. 49 is an enlarged view of a portion of the outlet cover shown in FIG. 45, with alternative features shown.

DETAILED DESCRIPTION

Herein, example filter assemblies, filter cartridges, features and components therefor are described and depicted. A variety of specific features and components are characterized in detail. Many can be applied to provide advantage. There is no specific requirement that the various individual features and components be applied in an overall assembly with all of the features and characteristics described, however, in order to provide for some benefit in accord with the present disclosure.

It is noted that a plurality of embodiments are depicted and described. The embodiments are not meant to be exclusive with respect to features depicted. That is, selected features of one embodiment can be applied in one or more of the other embodiments if desired, to advantage. In many examples, the filter assembly depicted is an air cleaner assembly, for example, used to filter intake air for an internal combustion engine. However, the concepts disclosed are not in any way limited to such an application and may be applied across a variety of different applications, such as crankcase ventilation. The disclosed filter assemblies are generally "gas filter assemblies," since the carrier stage being filtered is gas (air or crankcase ventilation gases). While the techniques described herein will typically be used in application for gas filtration, they can be used in the filtration of other materials, for example, liquids, if desired.

I. Filter Assembly—General Description

Figure 1:
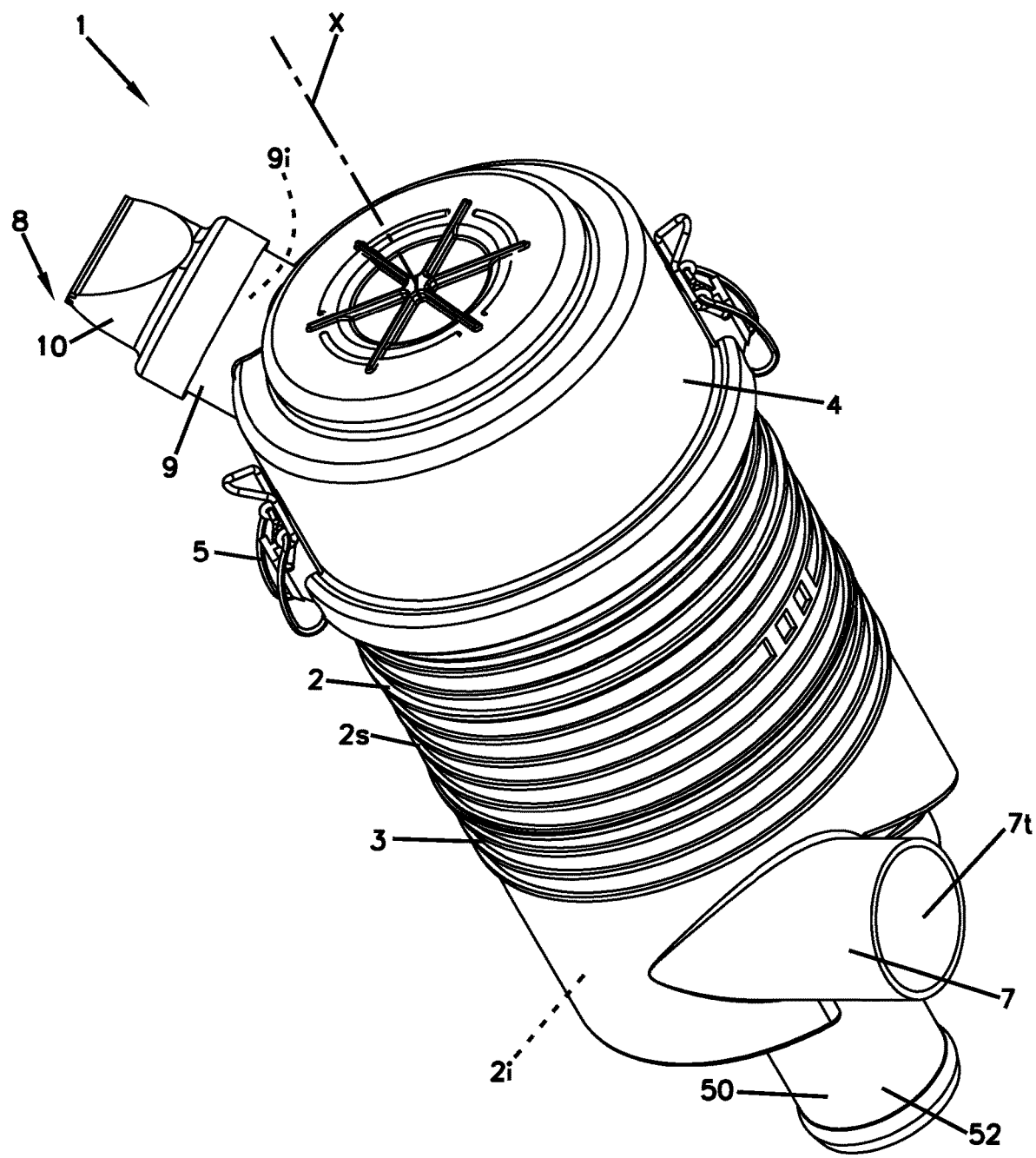
FIG. 1 is a perspective view of an air cleaner assembly including a housing assembly with at least one filter cartridge installed therein according to the present disclosure.

The reference numeral 1, FIG. 1, generally indicates a filter assembly, for example an air cleaner or air cleaner assembly or arrangement in accord with the present disclosure. The filter assembly (in the example an air cleaner assembly) 1 comprises a housing 2. The housing 2 defines a sidewall 2s and includes: a first body or housing section 3; and a second body section or access cover 4. In the example depicted, the access cover 4 is removably secured to the first body section 3, but alternatives are possible. Also although alternatives are possible, for the example depicted, attachment of the cover section 4 to the body section 3 is by a latch arrangement 5 including over center latches. The cover section 4 can alternatively be held to the body section 3 by a twist lock arrangement. An exemplary twist lock arrangement is depicted in U.S. application Ser. No. 15/192,272, filed on Jun. 24, 2016, the disclosure of which is incorporated herein by reference. The cover section 4 can be held to the body section 3 by latches 5 such as, for example, over center latches.

In general, the air (gas) cleaner 1 includes an air (gas) flow inlet arrangement 7. In the example depicted, the air flow inlet arrangement 7 is an inlet tube indicated at 7t, on the body section 3. The particular inlet tube 7t depicted, is configured as a side, tangential, inlet, i.e. gas flow is directed tangentially against an inner wall of housing 2, as opposed to being directed directly toward a housing central axis X. Alternate inlet arrangements, locations and direction are possible. However, the tangential inlet arrangement depicted is convenient and advantageous for reasons discussed below.

At 8, a dust/water ejector arrangement is depicted on the housing 2, comprising tube 9. In the example depicted, the tube 9 comprises a portion of access cover 4, although alternatives are possible. The tube 9 is covered by an evacuator valve arrangement 10, in the example depicted comprising a duck-billed valve of a type widely used with air cleaners, see for example WO 2006/026241 A1; U.S. Pat. Nos. 6,419,718 B1 and 8,864,866, incorporated herein by reference. Alternate evacuator valve arrangements can be used.

At 50, an outlet cover having an outlet tube or flow tube 52 is depicted, as a portion of housing 2 positioned on a remainder of the housing body section 3. The outlet cover 50 can be formed integral with the housing body 3, but is shown as being a separate piece attached to the housing body 3 via fasteners. As shown, the outlet structure or tube 52 extends into the interior of the housing such that the filter cartridges can seal against the outlet structure 52. The outlet structure also extends to the exterior of the housing. In the embodiment shown, the interior and exterior extending portions of the outlet structure 52 are discontinuous in that they are not of the same diameter. However, these features, which are integrally formed with the outlet cover, provide for a continuous pathway from the interior of the housing to the exterior of the housing.

In operation, air (gas) to be filtered enters the air cleaner assembly through inlet tube 7t. Eventually the air passes through filter media of a filter cartridge arrangement positioned within interior 2i of the housing 2. After passage through media of the air filter cartridge, the filtered air is directed to exit the housing through outlet tube 52. From outlet tube 52, the filtered air is directed to downstream equipment such as to a turbo system or to the air intake of an engine system.

The particular air cleaner (filter) assembly 1 depicted includes an optional precleaner stage. The precleaner stage is provided in part by directing air from inlet tube 7t tangentially into interior 2i of the housing 2. The air will then be directed into a cyclonic pattern around an interior of the assembly 1. This will tend to drive a portion of any water or dust particles contained within the air stream, against an interior surface of sidewall 2s. This material, separated from the air stream, will eventually migrate to, and enter, the tube 9, from which ejection occurs through valve 10.

The particular air cleaner assembly 1 depicted is configured so that it can be mounted in a variety of orientations, for example with the central axis X directed vertically, or alternatively with the central axis X directed horizontally. This is facilitated by having outlet tube 9 directed downwardly.

The housing body section 3 can include a mounting pad arrangement thereon. The mounting pad arrangement can be formed integral with a remainder of the housing 2 or it can be a separate piece. The mounting pad arrangement is used to help secure the housing 2 in place, on equipment with which air cleaner 1 would be used. By having the mounting pad arrangement on the housing section 3, the housing section 3 can be retained in place on the equipment by bolts, or other systems during servicing, with access cover 4 being removably secured to body section 3, for convenient servicing. An exemplary mounting pad arrangement that can be used as part of the housing section 3 is disclosed in U.S. Pat. No. 8,864,866, the disclosure of which is incorporated herein by reference.

As thus far described the air cleaner assembly is similar to many prior air cleaner assemblies, including those depicted and described in WO 2006/026241 A1; WO 2009/014988; U.S. Pat. Nos. 6,419,718 B1 and, 8,864,866, the disclosures of which are incorporated herein by reference.

Figure 2:
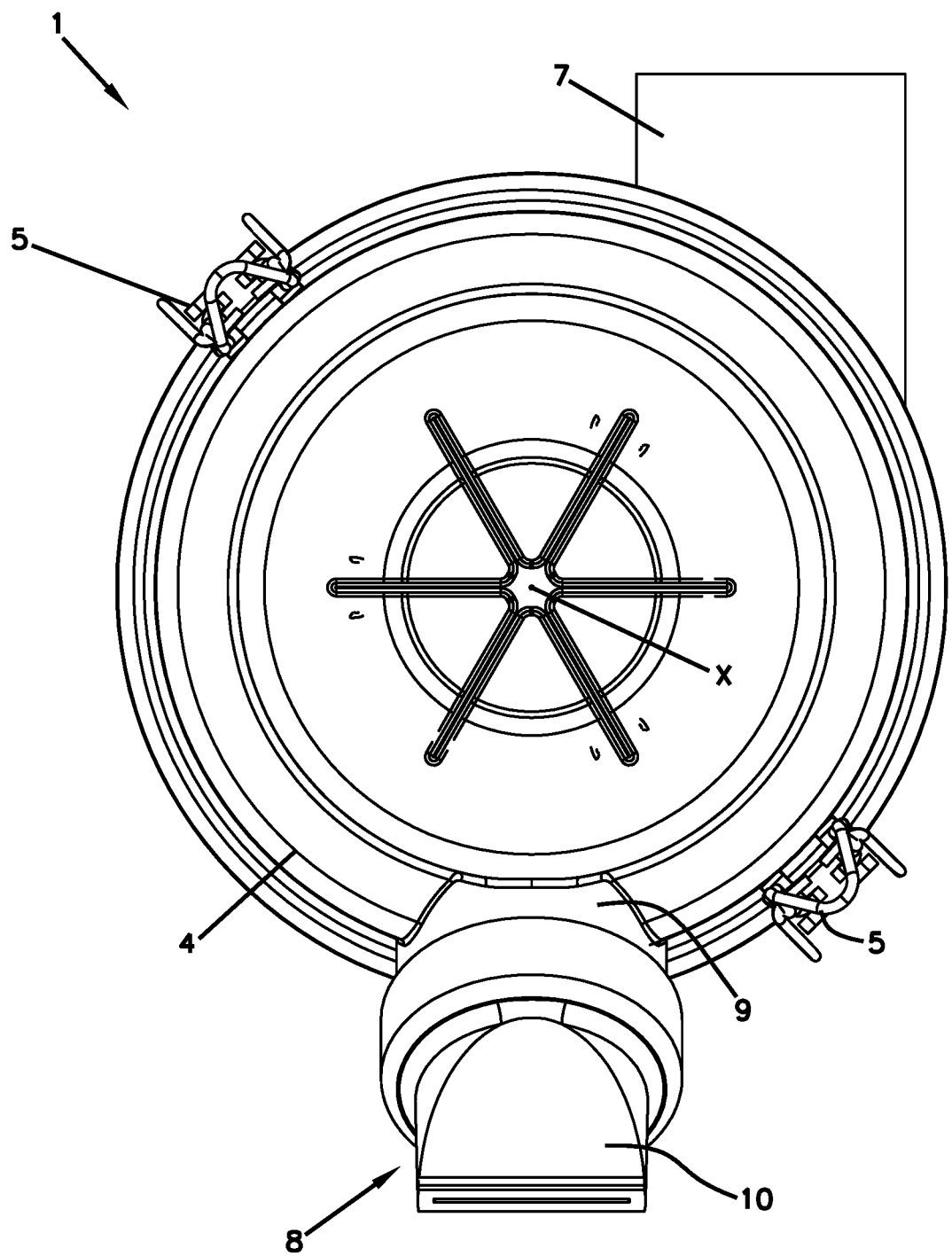
FIG. 2 is a top view of the air cleaner assembly shown in FIG. 1.
Figure 6:
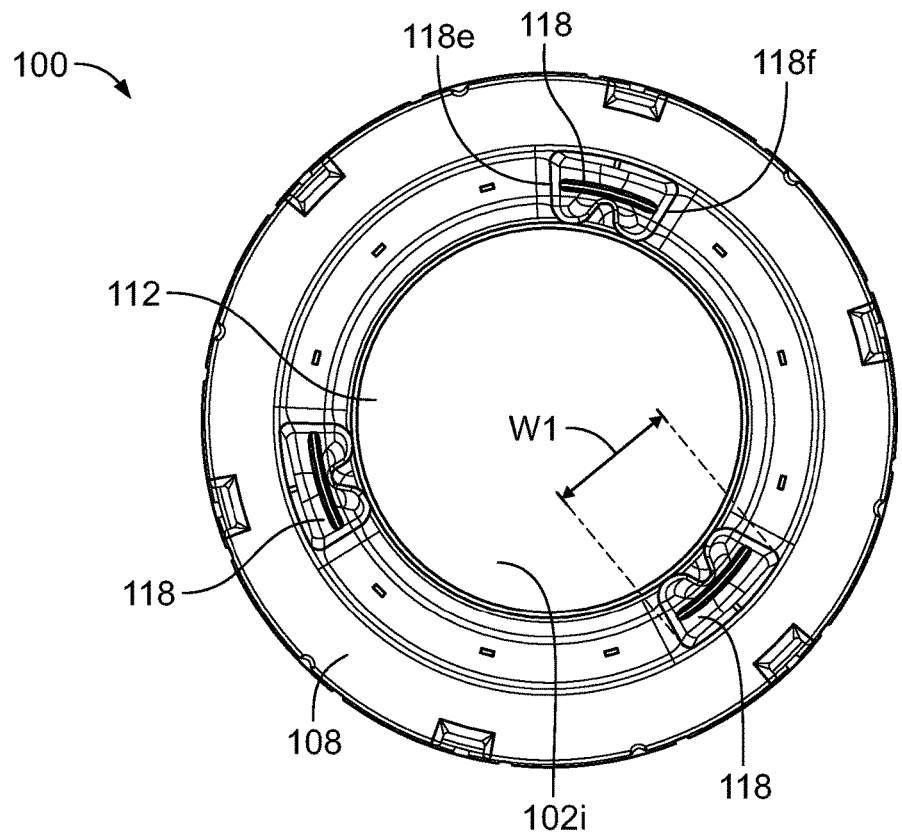
FIG. 6 is a top view of the first filter cartridge shown in FIG. 4.
Figure 27:
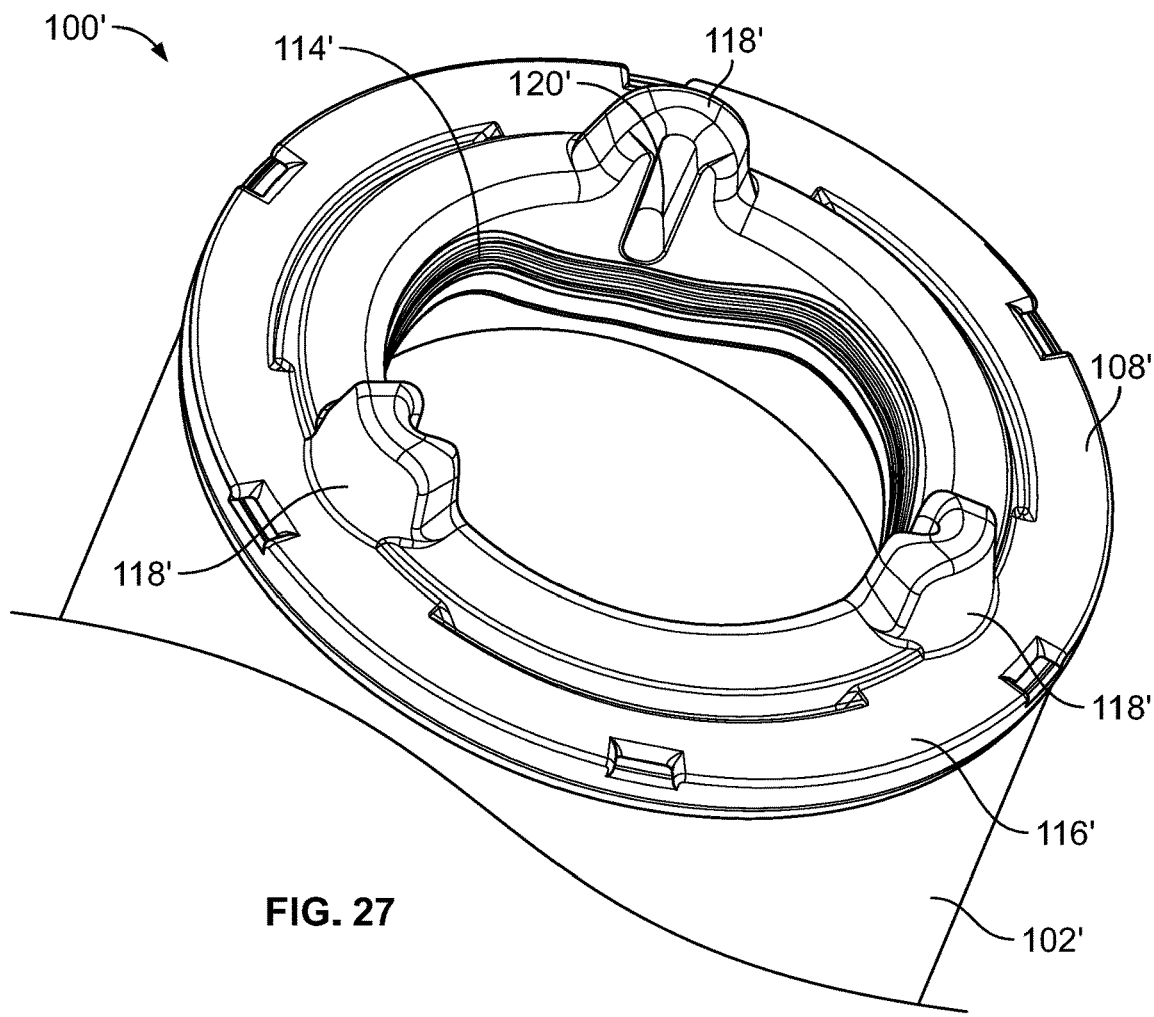
FIG. 27 is a perspective view of a second example of a first filter cartridge usable within the air cleaner assembly shown in FIG. 1.
Figure 28:
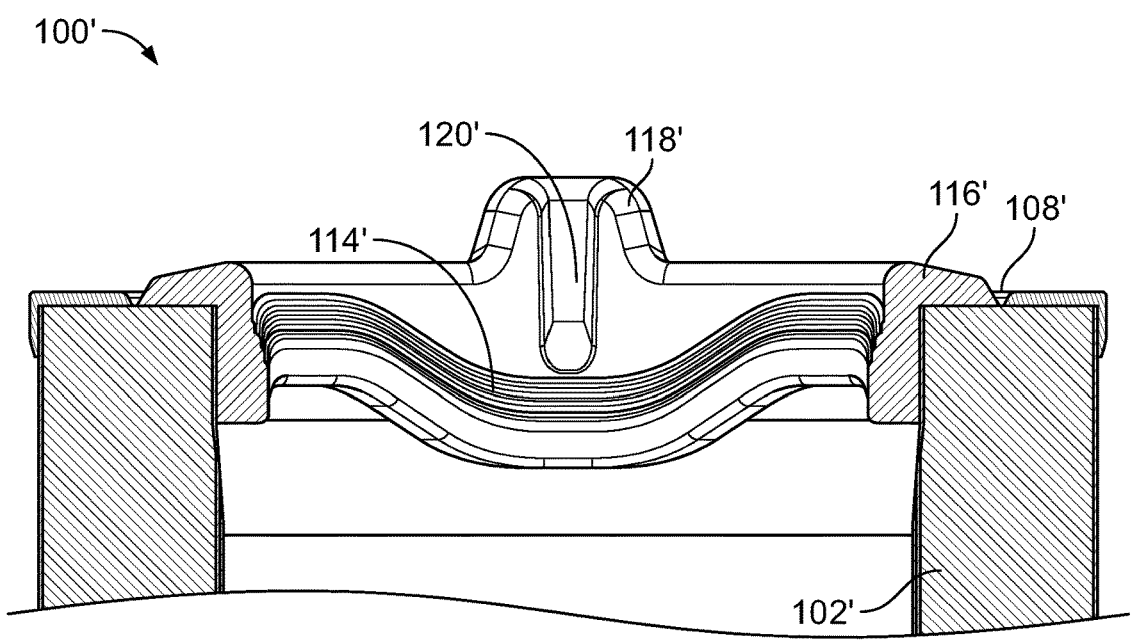
FIG. 28 is a cross-sectional side view of the first filter cartridge shown in FIG. 27.
Figure 31:
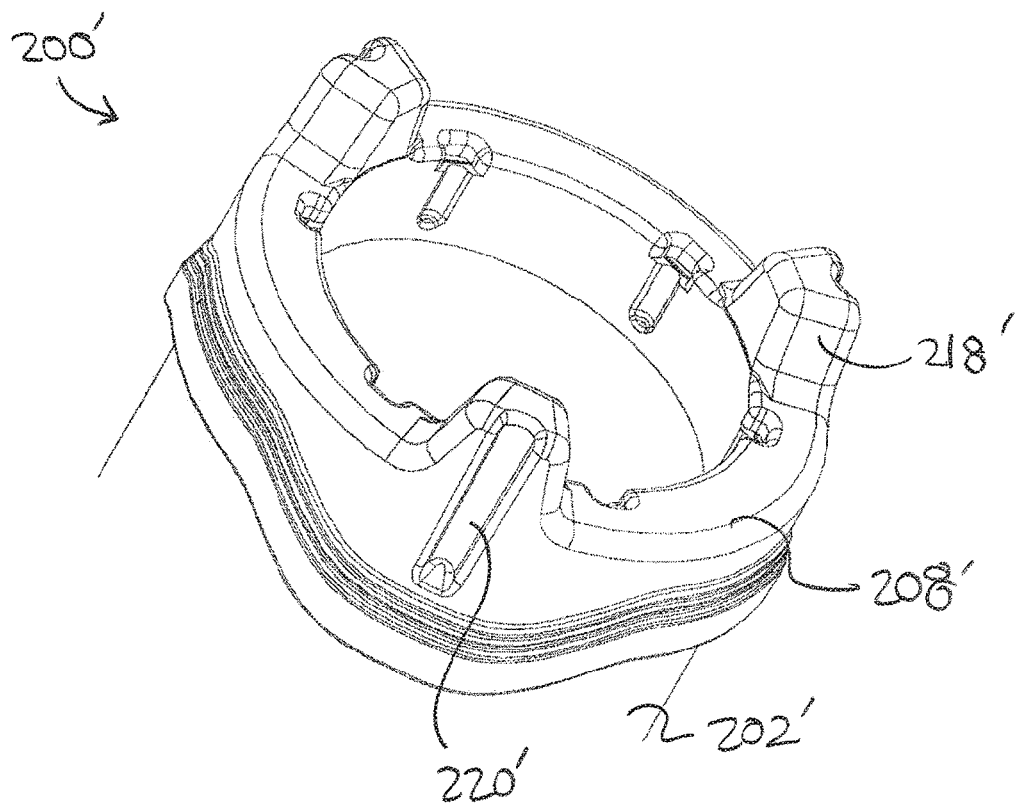
FIG. 31 is a perspective view of a second example of a second filter cartridge usable within the air cleaner assembly shown in FIG. 1.
Figure 32:
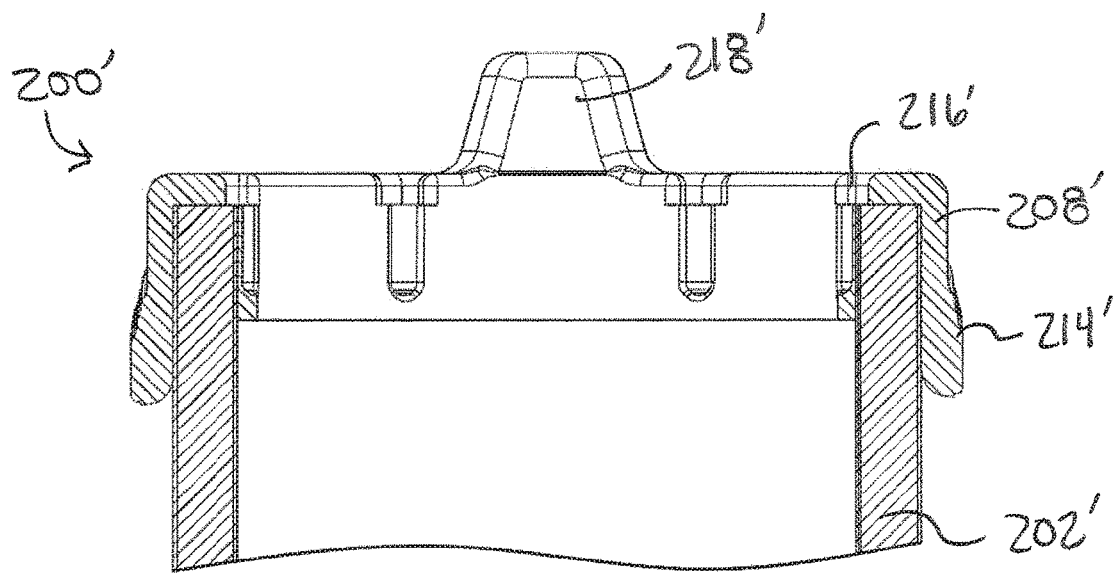
FIG. 32 is a cross-sectional side view of the second filter cartridge shown in FIG. 31.
Figure 35:
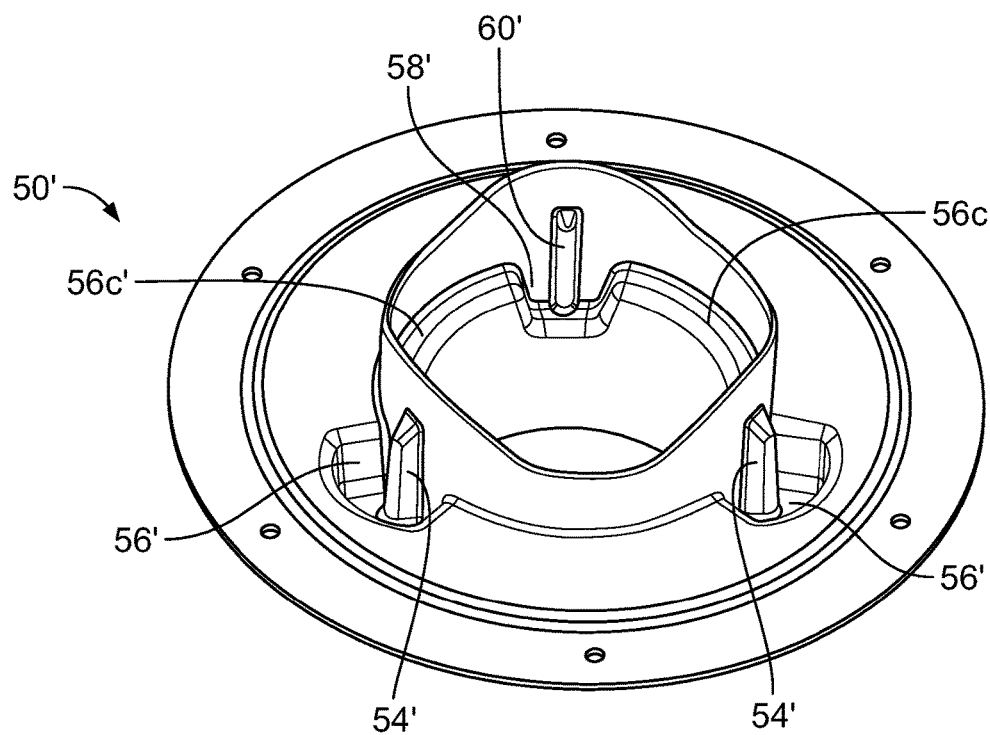
FIG. 35 is a perspective view of a second example of an outlet cover usable in with the air cleaner assembly of FIG. 1 and the filter cartridges shown in FIGS. 27, 28, 31, and 32.
Figure 36:
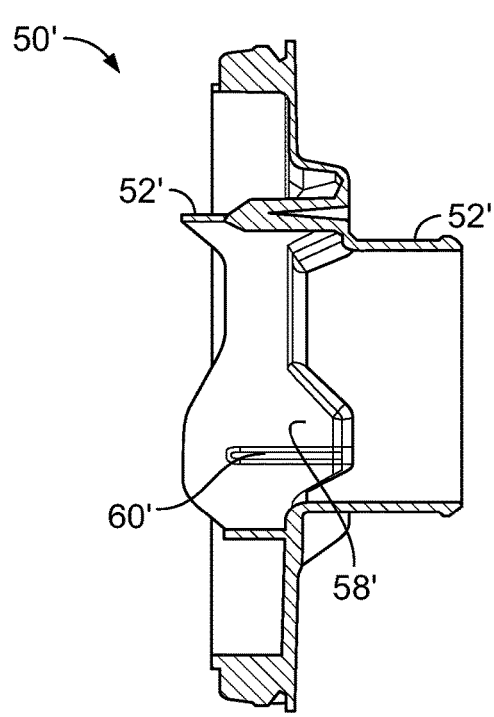
FIG. 36 is a cross-sectional side view of the outlet cover shown in FIG. 35.
Figure 37:
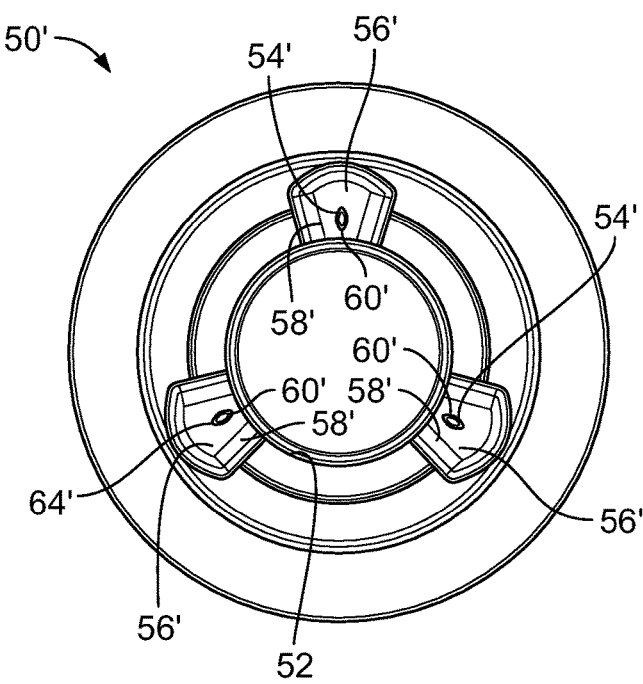
FIG. 37 is a bottom view of the outlet cover shown in FIG. 35.

Reference is now made to FIGS. 3 and 4, which show the housing assembly of FIGS. 1 and 2 used in conjunction with a first example of serviceable internal filtration components that can be provided within the housing 2. In the exploded view of FIG. 3, a first filter cartridge 100 and a second filter cartridge 200 are viewable and shown as being positionable within housing interior 2i. Each of the filter cartridges 100, 200 is configured to form a seal with the outlet cover 50. Alternative configurations of the first filter cartridge 100 are shown at FIGS. 27-28 (cartridge 100') and at FIGS. 29-30 (cartridge 100"). Alternative configurations of the second filter cartridge 200 are shown at FIGS. 31-32 (cartridge 200') and at FIGS. 33-34 (cartridge 200"). An alternative configuration of the outlet cover 50 is shown at FIGS. 35-37. The filter cartridges 100', 200' can be used in together with the outlet cover 50' within the housing 2 shown at FIGS. 1-3. Similarly, filter cartridges 100" and 200" can be used together within the housing 2 shown at FIGS. 1-3. Each of these variations will be discussed in greater detail below.

The filter cartridge 100 can be referred to as a primary filter cartridge or primary filter element, and the filter cartridge 200 can be referred to as a secondary or safety filter cartridge or secondary or safety filter element. In general, the cartridge 100 is a serviceable component that includes an extension of filter media 102 through which air to be filtered passes, before it can exit assembly 1. Likewise, the cartridge 200 is a serviceable component that includes an extension of filter media 202 through which air to be filtered also passes before exiting assembly 1. By the term "serviceable component", as used herein in reference to the cartridges 100, 200, it is meant that the cartridges 100, 200 are removable and replaceable in the air cleaner assembly 1. Thus, as media 102, 202 of the filter cartridges 100, 200 occludes during use, the cartridge 100 and/or the cartridge 200 can be removed, and can be refurbished or replaced.

In one aspect, the housing 2 can include an optional, but advantageous, shield arrangement surrounding a selected portion of the filter cartridge 100. The shield arrangement can be used to inhibit direct impingement, of dust and other material carried by the inlet air onto the media 102 until after the air has moved at least partially through the cyclonic pattern and past shield in a direction toward access cover 4. Such a shield helps facilitate removal of dust and other materials into dust ejector arrangement 8. Use of shield arrangements is common in many air cleaner arrangements, see for example WO 2006/026241 A1; WO 2009/014988; U.S. Ser. No. 61/446,653; U.S. Ser. No. 61/473,296; U.S. Pat. Nos. 6,419,718 B1 and 8,864,866, the disclosures of which are incorporated herein by reference. Analogous features and principles can be used here.

It is noted that the use of a shield arrangement and dust ejector arrangement 8 is consistent with many applications in which a "dual stage" or "two stage" air (gas) cleaner is desired, having a first precleaner stage to separate water and larger particles from the air before it passes into the filter cartridge 100 (the second stage). However, such features are generally optional, and many of the principles of the present disclosure can be applied in air cleaners that do not have such a two stage configuration or precleaner stage.

Downstream of the filter cartridge 100 is the secondary filter cartridge 200 so that air passes through both of the filter cartridge 100 and the filter cartridge 200 prior to exiting via the air outlet 52. It should be understood that the air cleaner assembly 1 can be operated with the filter cartridge 100 alone, with the filter cartridge 200 alone, or with both the filter cartridge 100 and the filter cartridge 200 provided together and as shown in FIG. 2.

II. Filter Assembly—First Filter Cartridge 100, 100', 100", 100''', 300

As indicated above, many of the features previously identified and discussed with respect to FIGS. 1-3 relating to general air cleaner configuration (filter assembly) and operation are well known features, forms of which have been used in a variety of systems.

The filter cartridge 100 can be referred as a primary filter cartridge or as a primary filter element, and the filter cartridge 200 can be referred to as a secondary or safety filter cartridge or as a secondary or safety element. In general, the primary filter cartridge or primary filter element and the secondary or safety filter cartridge or the secondary or safety filter element can be referred to as the filter cartridge or the filter element for convenience. Based on context, it should be apparent that references being made to the primary filter cartridge or the secondary filter cartridge.

In general terms, again, the cartridges 100 and 200 are serviceable components. That is, they can be removed and replaced through the lifetime of the air cleaner 1. A releasable seal is necessary between the cartridge 100 and a portion of the outlet cover 50 and between the cartridge 200 and the outlet cover, to allow the cartridges to be serviceable components and to ensure that unfiltered air does not bypass the cartridge 100 and/or the cartridge 100 and enter the outlet tube 52, as this can cause damage to the engine.

The filter cartridge 100 generally includes filtration media 102 extending between first and second opposite media ends 104 and 106. First media end 104 is engaged by a first end cap or piece 108. The second media end 106 is engaged by a second end cap or piece 110. Thus, the media 102 extends between opposite end caps (or end pieces) 108, 110.

Although alternatives are possible with selected techniques described herein, for the example depicted, the filter media 102 is configured surrounding an open filter interior 102i, generally around a central axis X of the air cleaner 1 and cartridge 100. The media 102 can be pleated media, although alternatives are possible. The media 102 can be configured in a cylindrical pattern as shown, if desired, although alternatives are possible. For example, the media 102 can be somewhat conical in extension between the opposite ends 104, 106. Also, the media 102 can be configured with non-circular inner and/or outer perimeters; for example oval or other cross-sectional configurations are possible. In addition, the primary filter cartridge 100 can be provided with a screen or support structure 102s extending from the first end 104 to the second 106 to help support the filtration media 102 while allowing gas (air) to pass therethrough. The filtration media 102 can be embedded in the first and second end caps 108 and 110. In addition, the screen or support structure 102s for the filtration media 102 can be embedded in the first and second end caps 108 and 110.

Although alternatives are possible with selected techniques described herein, the second end piece or cap 110 is typically a closed end piece or cap, extending completely across the media 102 at the second end 106, closing that end 106 of the media 102 and the filter interior 102i. That is, end piece or cap 110, for the example depicted, is a closed end piece or cap, i.e. an end cap having no aperture therethrough in communication with the open filter interior 102i.

First end piece or cap 108 on the other hand, is an open end piece or cap. That is, it surrounds and defines a central aperture 112 in communication with the media, in the example via open filter interior 102i. In typical use, aperture 112 is an air flow exit aperture from the media, for example open filter interior 102i, for filtered air. In alternate applications with a reverse direction of gas flow during filtering, aperture 112 can be an inlet aperture. In general, it is a gas flow aperture.

For the example depicted, first end cap 108 extends completely across all media 102 of the cartridge 100, from an outer perimeter 108a to an inner perimeter 108b. The first end cap 108 typically has only one, central, aperture 112 therethrough.

Again, when the access cover 4 is removed from the housing body section 3, access to interior 2i is provided for either installation or removal of the cartridge 100. The filter cartridge 100, then, needs to be adequately removably sealed to the outlet cover 50 to protect against flow of unfiltered air into the exit tube 52. To provide for this, the cartridge 100 is provided with a primary (or housing) seal arrangement 114.

With respect to the first housing seal or primary seal arrangement 114, and other features of first end cap 108, attention is directed to FIGS. 6-7 and 18-20. The primary seal arrangement 114 can be seen as defining a radially directed seal or seal surface 114s directed to engage a surface 52s1 of the outlet cover flow tube 52, for releasable sealing. Accordingly, the primary seal arrangement 114 forms an inwardly directed radial seal with the outlet tube 52 when the primary filter cartridge 100 is installed in the filter assembly 1.

Figure 7:
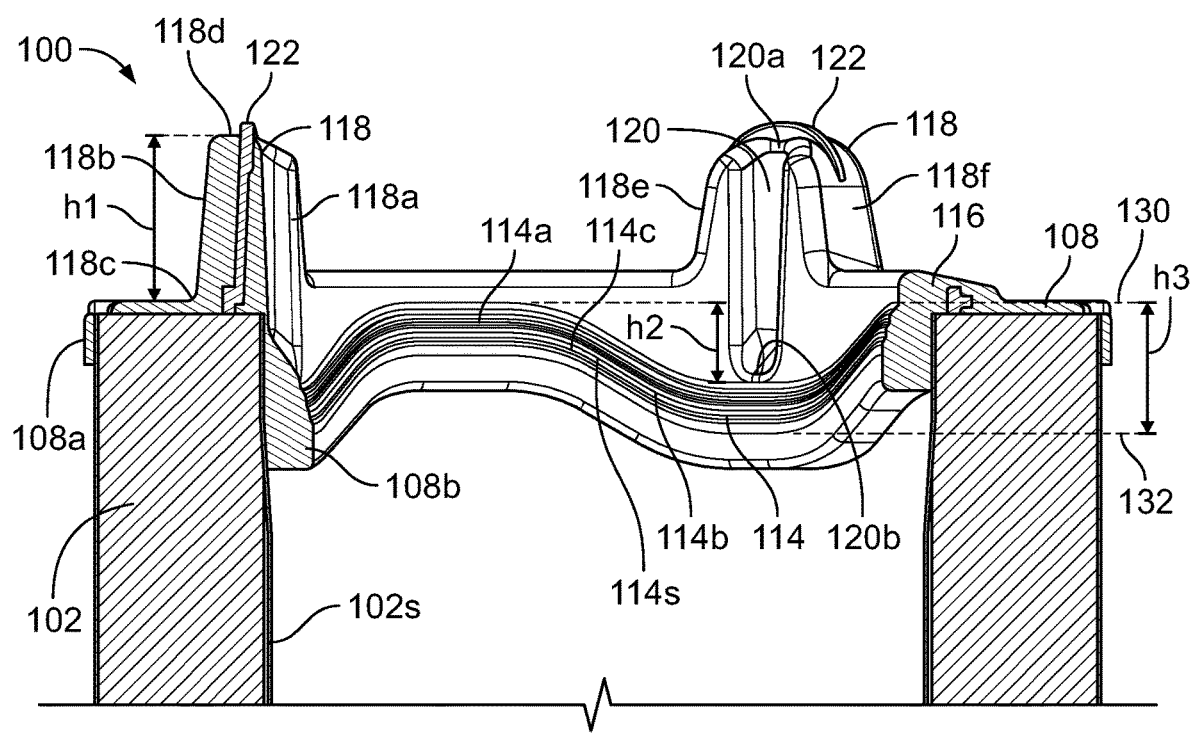
FIG. 7 is a cross-sectional side view of the first filter cartridge shown in FIG. 4.

Still referring to FIG. 7, it will be understood that the surface 114s, of primary seal arrangement 114, that forms a seal with outlet tube 52 is generally a radially directed surface. Hence, the primary seal arrangement 114 can be referred to as a radially directed seal. By "radially" in this context, it is meant that the seal or seal surface (and the compression of the seal surface during sealing) is directed generally toward or away from (i.e. around) central axis X. The particular surface 114s in the example depicted, is radially inwardly directed relative to the central axis X, so the seal arrangement 114 can be characterized as "radially inwardly directed." It is noted however, that a radially outwardly directed seal can be used with the same principles in accord with the present disclosure.

It is noted that in the example depicted, the housing seal arrangement 114 comprises a portion of end cap 108. In more general terms, the housing seal arrangement 114 is mounted on a filter cartridge and is configured to releaseably seal to a housing component or outlet tube 52, whether that particular housing seal arrangement comprises a portion of an end piece or not.

The preferred and advantageous housing seal arrangements described herein are generally "non-clamp" or "clampless" housing seal arrangements. By this it is meant that they are established as the cartridge is inserted into the housing, without the need for tightening the clamp or connector of some type.

In one aspect, the end cap 108 and seal arrangement 114 can be constructed in a manner so that the amount of radial compression of end piece (cap) material in a region between surface 114s and the support media 102 or support 102s will have a maximum compression of at least 10%, typically at least 15%, preferably no more than about 35% and will typically be with a maximum compression within the range of about 20-30%, inclusive. To accomplish this, a seal support can be provided within the end cap 108. In one aspect, the seal arrangement 114 has a stepped profile such that the seal arrangement has a smaller diameter proximate the closed end cap 110 in relation to the diameter most remote from the closed end cap 110. This stepped profile facilitates easier acceptance onto the outlet tube 52 and also allows for progressive compression of the seal arrangement 114 during installation. Although a stepped profile is shown, many other profiles can be utilized, for example, profiles having cross-sectional shapes that are rectangular, oblong, geometric, chamfered, and/or round.

In one aspect, the seal arrangement 114 on the end cap is also provided with an axially deviating profile, wherein first portions 114a of the seal arrangement 114 are disposed at a first axial position and second portions 114b of the seal arrangement 114 are disposed at a second axial position 114b. The first and second portions 114a, 114b, which are separated by a height h2, are interconnected by sloped intermediate portions 114c. In one aspect, the edges of the first portion 114a most remote from the closed end cap 110 extend along a radial plane 130 while the edges of the second portion 114b most proximate the closed end cap 110 extend along a radial plane 132. As most easily seen at FIG. 7, the radial planes 130, 132 extend orthogonally with respect to the longitudinal axis X and are separated by a height h3. In the example shown, three first portions 114a and three second portions 114b are provided with six intermediate portions 114c therebetween. More or fewer portions 114a, 114b, 114c may be provided to obtain the desired axial deviation pattern.

In one aspect, the end cap 108 can be characterized as having a main body 116 from which a plurality of discrete, circumferentially spaced extension members 118 can extend axially away from the main body 116. In the example shown, the extension members 118 are radially aligned with the seal arrangement second portions 114b. However, the extension members 118 may be oriented to align with the first portions 114a and/or the intermediate portions 114c. In the example shown, three similarly sized and configured extension members 118 are shown at an equal spacing from each other. However more or fewer extension members 118 could be provided. The extension members 118 are also not required to have an identical shape, size, or spacing. Instead, the filter cartridge 100 could be provided with differently sized or arranged extensions members 118.

Each of the extension members 118 has radially inward and outward facing sides 118a, 118b that extend from a base end 118c to a distal end 118d (to a height h1) and between first and second sides 118e, 118f (at a width w1). As presented, the first and second sides 118e, 118f slope inwardly towards each other in a direction from the base end 118c toward the distal end 118d. In the example shown, the sides 118e, 118f are disposed at about a 10 degree angle from the longitudinal axis X such that the angle defined between the sides 118e, 118f is about 20 degrees. In this example, the ratio between the height h1 and the width w1 is about 0.8. Other dimensions and configurations are possible. For example, the sides 118e, 118f could be parallel to the longitudinal axis X such that they extend vertically from the main body 116. When the filter cartridge 100 is fully installed into the housing 2 and onto the outlet cover 50, the extension members 118 are received into recesses or pockets 56 of the outlet cover 50. Once in this position, the sides 118e, 118f contact sidewalls 56a, 56b of the recess to prevent rotation of the cartridge 100 with respect to the outlet cover 50. In the example shown, the contact between the sides 118e, 118f and the sidewalls 56a, 56b occurs along only a portion of the sides 118e, 118f. In other examples, the sidewalls 56a, 56b can be configured to be parallel to the sides 118e, 118f such that a greater contact length is achieved.

Each of the extension members 118 is provided with one or more rotational alignment features that enable the filter cartridge 100 to be properly aligned with respect to the outlet cover 50 and within the housing 2. In the example shown, each extension member is provided with an optional axial channel or recess 120 extending from a distal end 120a proximate the extension member distal end 118d to a base end 120b that is within the interior space 102i proximate the seal structure second portions 114b and adjacent to the media 102. Accordingly, the axially deviating seal arrangement first portions 114a are located between the channels or recesses 120 while the second portions 114b are located axially below the channels or recesses 120. In alternate arrangements, the channels or recesses 120 are not aligned with the second portions 114b. However, in such an example, the length of the channels or recesses 120 would be limited by the axial location of the portion of the seal arrangement 114 with which the channels or recesses 120 are aligned. The shown arrangement allows for the channels or recesses 120 to have the maximum possible length.

In the example shown, the axial recess 120 has a width and depth that each taper or narrow in a direction from the distal end 120a to the base end 120b. As can be seen at FIGS. 18-20, the outlet cover 50 is provided with axially extending ribs 54 that are similarly tapered from a distal narrow end 54a to a wider base end 54b to form a complementary shape with the axial channels or recesses 120. Thus, when the filter cartridge 100 is initially being inserted into the outlet cover 50, the narrow end 54a of each rib 54 is received by the wider acceptance area of the distal end 120a of the recess 120. This arrangement allows for the filter cartridge 100 to be inserted towards the outlet cover 50 and subsequently rotated until the ribs 54 are aligned with the channels or recesses 120 at which point the filter cartridge 100 will drop further into place until the ribs 54 are fully received into the channels or recesses 120 and the extension members 118 are received into a recess 56 of the outlet cover 50. Once fully inserted, the ribs 54 fit tightly against the channels or recesses 120 to securely hold the filter cartridge 100 in the desired alignment with the seal structure 114 sealing against the outer surface 52s1 of the outlet tube 52.

Another rotational alignment feature associated with the filter cartridge 100 is provided by a guide member 122 which extends from each extension member 118. The guide member 122 has an arc-shape that generally follows the shape of the distal end 118d of the extension member 118. However, in contrast to the polyurethane extension member 118, the guide member 122 is formed from a relatively hard plastic, such as ABS (Acrylonitrile butadiene styrene) or PP (polypropylene plastic). The guide member 122 can thus be referred to as a low friction member in that it has lower frictional resistance with respect to the hard plastic housing. In some cases, the low friction member need not have a greater hardness than the extension members, provided the material of the low friction member acts to reduce friction to a level lower than that which would otherwise exist between the housing and the extension members. Where, the extension members are made from a relatively hard plastic, the guide member 122 can contribute to the stiffness of the extension members 118. In one aspect, the desired stiffness (and thus, the tactile feedback to the installer) of the extension members 118 can be achieved by designing the shape and size of the polyurethane forming the extension members and the shape and size of the portion of the guide members 122 embedded within the polyurethane. In some examples, a guide member is provided on less than the total number of extension members. For example, a filter cartridge could be provided with six extension members, three of which include the guide member.

During installation of the filter cartridge 100 into the outlet cover 50, the guide member 122 will initially contact sloped walls 56c or 56d adjacent the recess 56 when the extension members 118 are not perfectly aligned with the recesses or pockets 56. The sloped walls 56c and 56d are interconnected by a curved or radiused portion 56e to allow the guide member 122 to be smoothly guided in either direction towards wall 56c or 56d. As the outlet cover 50 is also formed from a relatively hard plastic, relatively little friction exists between the sloped walls 56c, 56d and the guide members 122.

Figure 24:
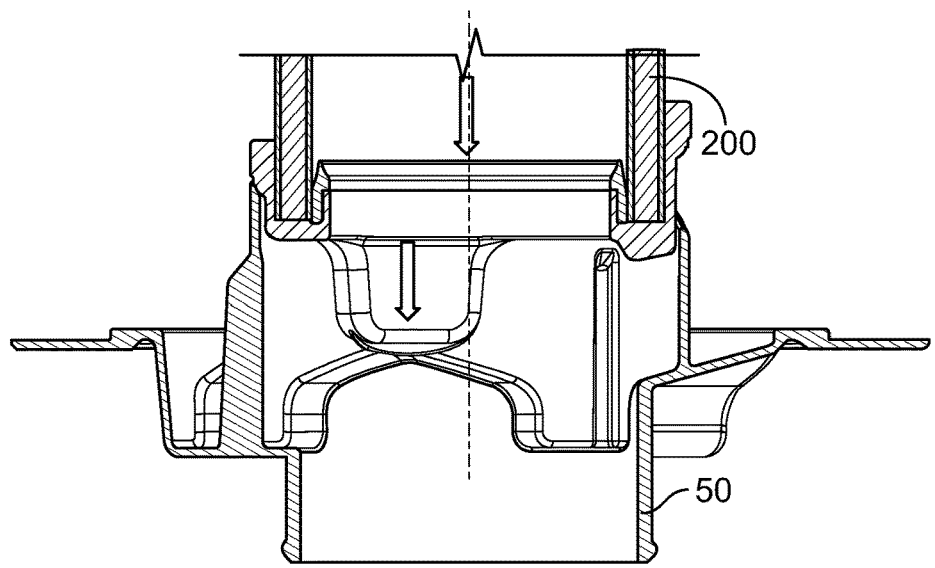
FIG. 24 is a cross-sectional side view of the first filter cartridge being initially inserted into the outlet cover shown in FIG. 3.
Figure 25:
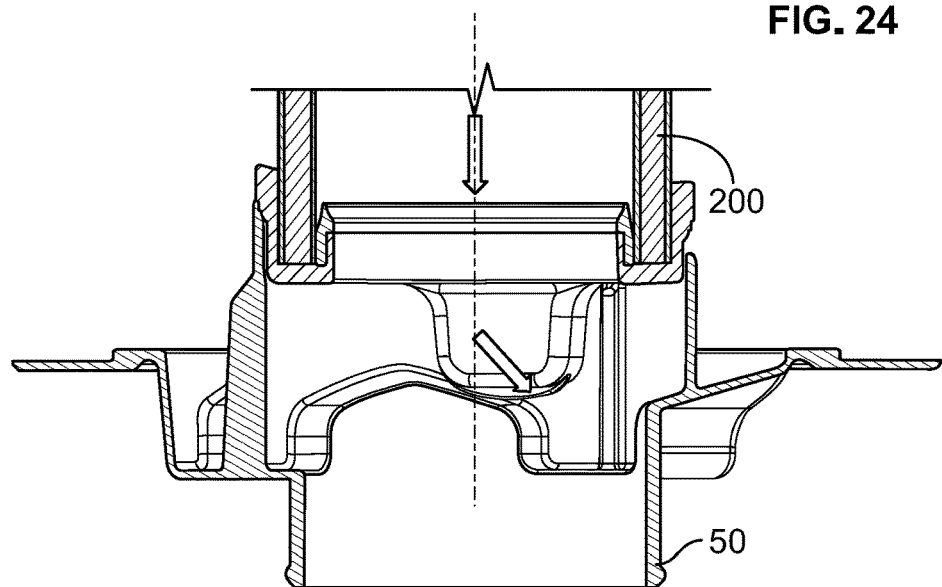
FIG. 25 is a cross-sectional side view of the first filter cartridge being further inserted into the outlet cover shown in FIG. 4.

FIG. 24 shows a condition in which filter cartridge 200, which is provided with a similar guide member, has been initially inserted into the outlet cover 50 such that the guide member is in contact with the sloped wall. FIG. 25 shows the filter cartridge further inserted wherein the guide members are sliding along the sloped walls such that the filter cartridge extension members are being gradually aligned with the recesses. Due to the sloped walls 56c, 56d and the low friction relationship between the hard plastic (e.g. ABS, PP) guide surfaces 122 and the hard plastic (e.g. ABS, PP) walls 56c, 56d, the filter cartridge 100 will automatically begin to rotate as the installer applies force to the filter cartridge in a direction towards the open end cap 108. Preliminary testing by the inventors has shown that this type of automatic rotation or translation of force cannot be easily achieved, if at all, when the portion of the extension members 118 that contacts the walls 56c, 56d are formed from a relatively soft material, such as polyurethane. Thus, the addition of the hard plastic guide members 122 are included in the end cap 108 to enable the axial force provided by the installer to be translated into rotational force.

The automatic rotation of the filter cartridge 100 will occur until one of the sides 118e, 118f of each extension member 118 comes into contact with the rib 54. At this point, the ribs 54 provide resistance to rotation of the filter cartridge 100, and the installer must then either apply additional axial force and/or begin to actively rotate the filter cartridge with a rotational force, depending upon the sloped configuration of the walls 56c, 56d and the configuration of the guide members 122. Notably, the slope of the walls 56c, 56d increases at a radius or curved portion 56e as the walls approach the recesses or pockets 56 in order to increase the amount of force that is translated from the axial direction to the rotational direction.

Figure 26:
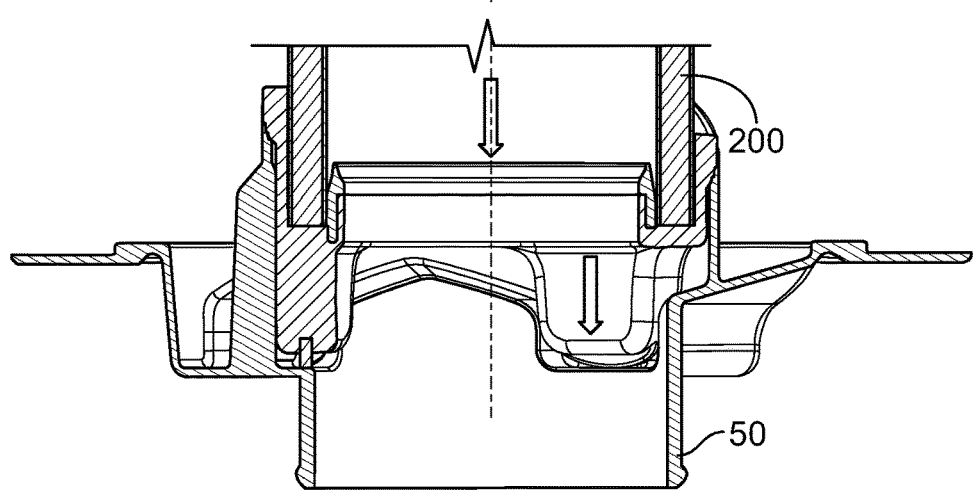
FIG. 26 is a cross-sectional side view of the first filter cartridge being fully inserted into the outlet cover shown in FIG. 4.

The extension members 118 are formed with enough flexibility such that they will deflect radially outwardly over the ribs 54 when the filter cartridge 100 is subjected to sufficient rotational force. As most easily seen at FIG. 18, the ribs 54 are provided with a dual tapered profile (i.e. rib narrows in direction from recess 56 towards end 52b and in a direction from the sealing surface 52s1 radially outward) to enable the extension members 118 to initially deflect over the ribs. As the filter cartridge 100 is forced to rotate, the ribs 54 will eventually snap into the channels or recesses 120 of the extension members 118, at which point the extension members 118 largely return to their original position. The snapping action that occurs when the ribs 54 snap into the channels or recesses 120 provides a tactile feedback to the installer, thereby providing verification to the installer that the filter cartridge 100 is fully installed. Once the filter cartridge 100 has been rotated to this point, the extension members 118 can then drop fully into the recesses or pockets 56, as shown at FIG. 26. Depending on how the installer applies force, the extension members 118 can drop into the recesses during rotation (if axial and rotational force are applied at same time) or after rotational force is applied to cause the ribs 54 to be received within the recesses or pockets 56. Of course, if the installer initially aligns the channels or recesses 120 with the ribs 54, the filter cartridge 100 can simply be dropped straight into the housing and pressed into the fully installed position without rotation. FIG. 26 shows the filter cartridge fully installed wherein the extension members 118 have dropped into the recesses. In some embodiments, the recesses or pockets 56 and extension members 118 are formed such that the guide members 122 no longer contact the housing once the cartridge 100 is fully installed. This can be accomplished by providing the recesses or pockets 56 with a longer depth such that the extension members 118 provide all contact with outlet cover 50 via the sidewalls 56a, 56b.

Figure 8:
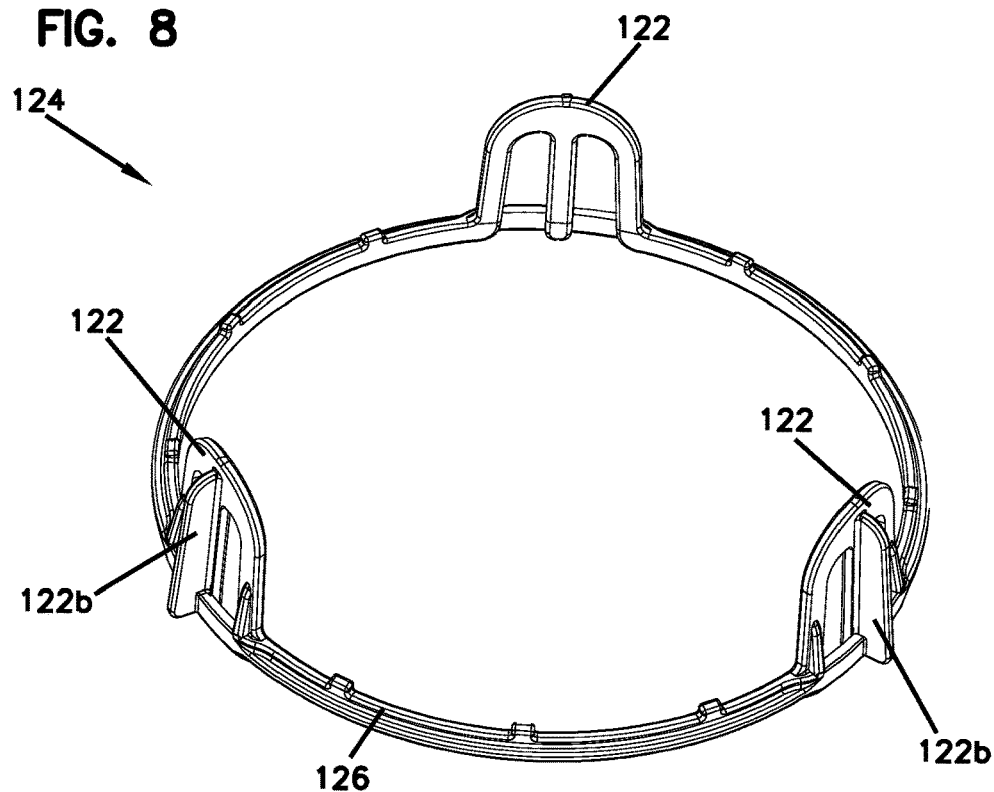
FIG. 8 is a perspective view of a ring member that is a part of the first filter cartridge shown in FIG. 4.
Figure 9:
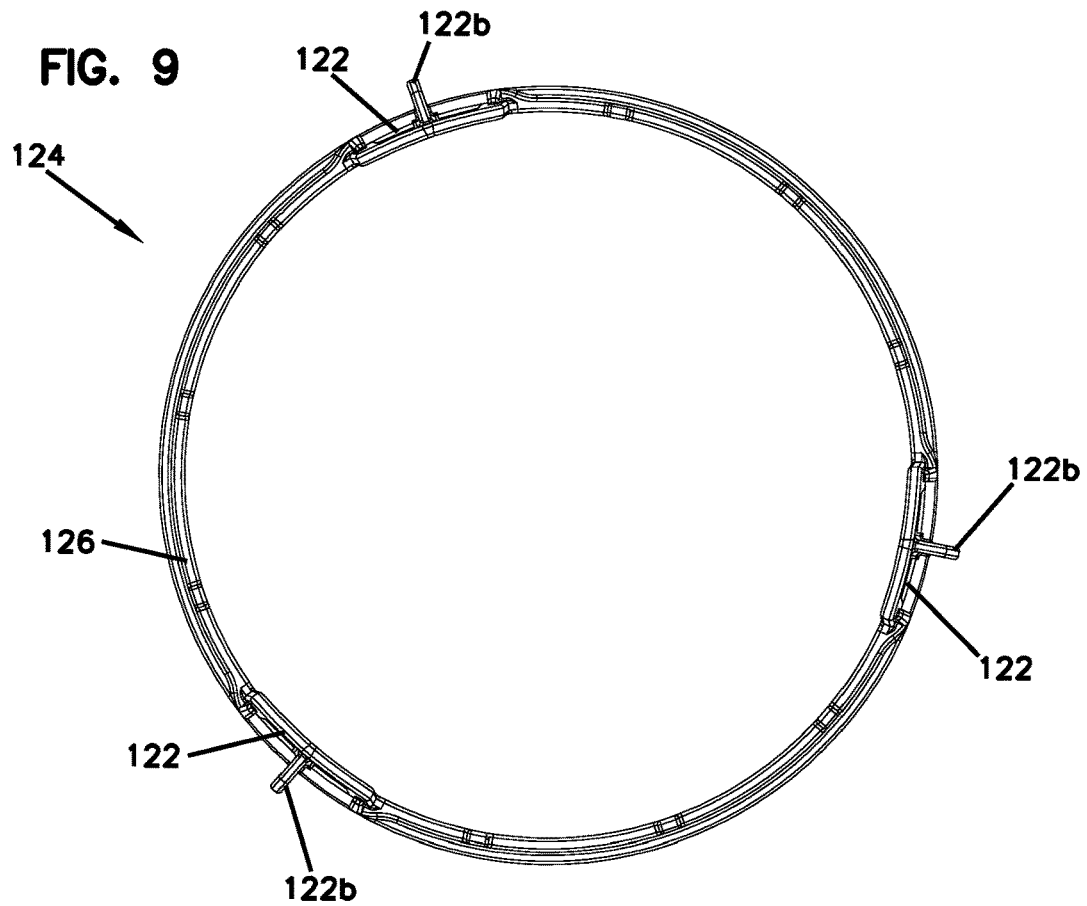
FIG. 9 is a top view of the ring member shown in FIG. 9.
Figure 10:
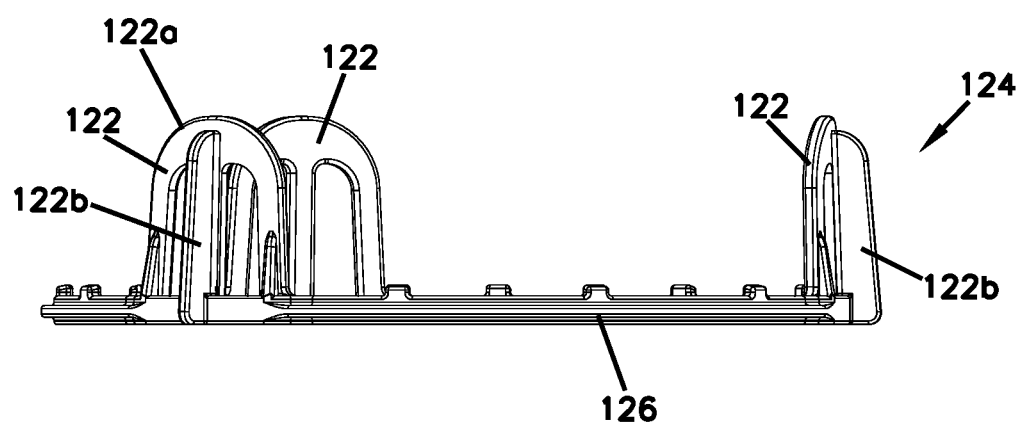
FIG. 10 is a side view of the ring member shown in FIG. 9.

Referring to FIGS. 8 to 10, it can be seen that the guide members 122 are formed from a ring structure 124 in which the guide members 122 extend upwardly from a base ring 126. As can be most easily seen at FIG. 7, the ring structure 124 is embedded within the polyurethane material of the end cap 108 such that only the distal end 122a extends beyond the extension members 118. In the embodiment shown, the guide members 122 are also provided with a support rib 122b which not only provides strengthening to the guide member 122 itself but also to the extension members 118 within which they are embedded within. In an alternative example, the extension members 118 can include separate guide members 122 that are either individually embedded into the extension members 118 or are simply attached to the distal ends 118d of the extension members 118. In one example, the guide members 122 are provided as an attachment to the extension members 118. The guide members 122 can also be formed such that they are integrally formed with the filter cartridge liner 102s. In one example, the guide members 122 are co-molded with the extension members 118.

As can be seen at FIGS. 27 and 28, an alternative filter cartridge 100' is shown. The filter cartridge 100' shares many common features with the filter cartridge 100. For such features, the description for the filter cartridge 100 is entirely applicable to filter cartridge 100' and need not be repeated here. Where similar features do exist, similar reference numbers are used. Rather, the description for filter cartridge 100' here will be directed to the differences between the filter cartridge 100 and 100'.

One such difference is that the guide members 122 are not provided for filter cartridge 100'. As such, the channels or recesses 120 are responsible for ensuring initial alignment of the extension members 118 until they are received within recesses or pockets 56' of the outlet cover 50'. The extension members 118' also have a slightly different shape with a lower height to width ratio, as compared to extension members 118. The outlet cover 50' is shown at FIGS. 35-37 and differs from cover 50 in that the walls 56c' are not sloped and are instead flat. Preliminary testing has shown that, without the presence of a hard plastic guide member 122, the filter cartridge will not automatically rotationally align, with an applied axial force, as too much friction essentially exists between the polyurethane extension member and the outlet cover walls. Accordingly, there is no need to provide walls 56c at a sloped angle towards the recesses or pockets 56' since the guide members 122 are not provided. The extension members 118' are also provided with sharper sidewall angles and more material to improve the tactile feedback when the channels 120' snap into the ribs of the outlet cover.

Figure 29:
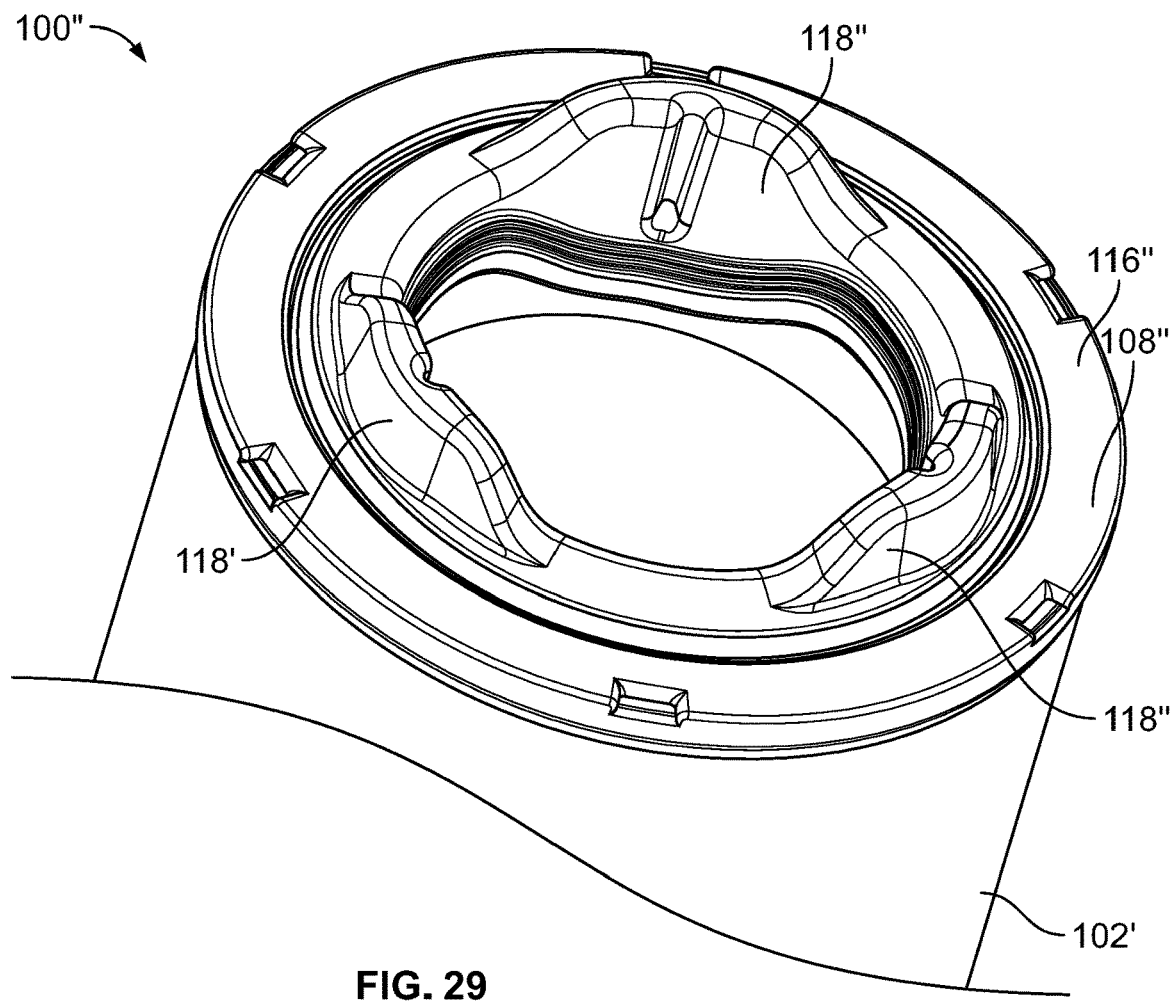
FIG. 29 is a perspective view of a third example of a first filter cartridge usable within the air cleaner assembly shown in FIG. 1.
Figure 30:
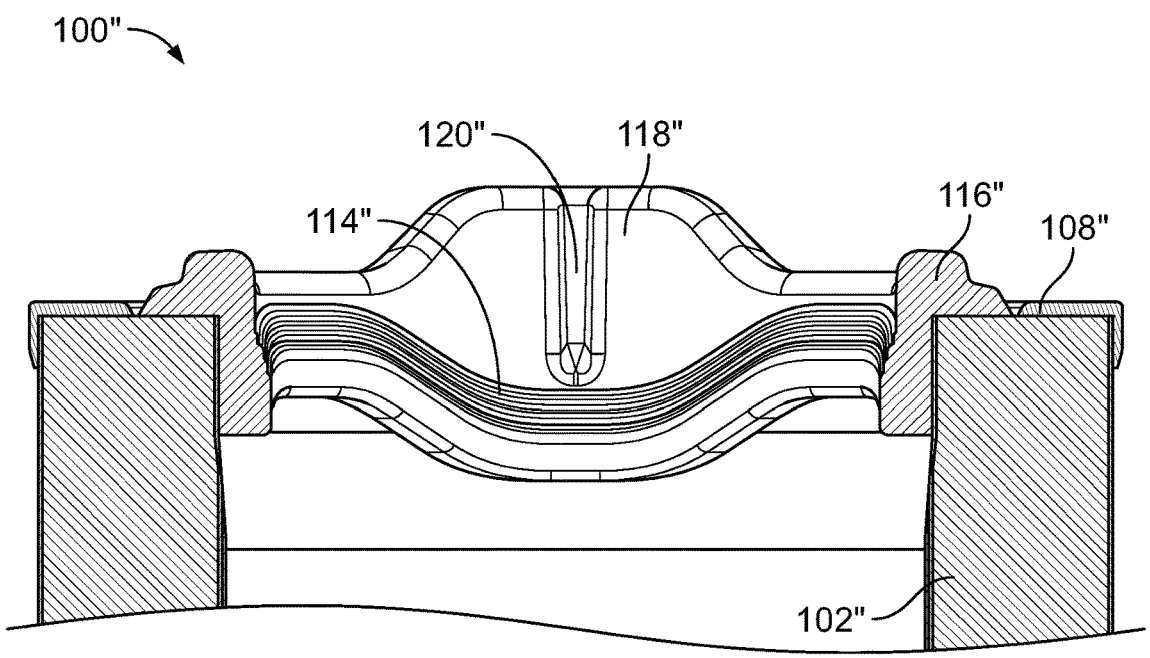
FIG. 30 is a cross-sectional side view of the first filter cartridge shown in FIG. 29.

As can be seen at FIGS. 29 and 30, another alternative filter cartridge 100" is shown. The filter cartridge 100" shares many common features with the filter cartridge 100 and 100'. For such features, the descriptions for the filter cartridges 100 and 100' are entirely applicable to filter cartridge 100" and need not be repeated here. Where similar features do exist, similar reference numbers are used. Rather, the description for filter cartridge 100" here will be directed to the differences between the filter cartridges. As with filter cartridge 100', filter cartridge 100" is provided without guide members 122. The primary remaining difference is that the extension members 118 are provided with a much greater width and the sidewalls of the extension members 118 are sloped at a greater angle towards each other. Accordingly, there is relatively less space between the extension members 118" in comparison to the first two embodiments. To accommodate the greater width extension members 118" of filter cartridge 100", the outlet cover recesses can be provided with a similar shape.

As can be seen at FIGS. 41-49, another alternative filter cartridge 100''' is shown that can be used with an alternative outlet cover 50". The filter cartridge 100''' shares many common features with the filter cartridge 100, 100', and 100". For such features, the descriptions for the filter cartridges 100 and 100' are entirely applicable to filter cartridge 100''' and need not be repeated here. Where similar features do exist, similar reference numbers are used. The description for filter cartridge 100''' here will be directed to the differences between the filter cartridges. As with filter cartridges 100' and 100", filter cartridge 100''' is provided without guide members 122. The primary remaining difference is that a greater number of extension members 118''' are provided at a closer spacing in comparison to the other embodiments. To accommodate the greater number of members 118''' and corresponding recesses 120''' of filter cartridge 100''', the outlet cover 50" recesses can be provided with a similar shape, as depicted at FIGS. 45-48. In the embodiment shown, the filter cartridge 100''' includes nine extension members 118''' and recesses 120'''. However, other numbers of extension members 118''' may be used depending upon, for example, the size and diameter of the filter cartridge.

Referring to FIG. 46, it can be seen that the rib structure 54" of the outlet cover 50" differ from rib structures 54 and 54' in that the top surface 54a" of the ribs 54" extends orthogonally from the outer surface of the outlet tube 52". Outlet cover 50" is also shown as being provided with additional rib structures 55" located on the outer surface of the outlet tube 52" such that the seal pathway along the outer surface is more tightly constrained. The rib structures 55" are shown as being a pair of spaced apart parallel ribs, although a single rib could be provided. Similar features can be provided on the interior surface of the outlet tube 52" where a safety filter is installed. Referring to FIG. 49, the outlet cover 50" is provided with an alternative rib structure 54''' in which a pair of parallel spaced apart ribs 54a" are provided instead of a single rib. The features and configuration of the ribs 54", 55", and 54''' can function to ensure that a proper filter cartridge is installed by limiting the available seal area on the outlet tube against which an incorrect filter could form a seal.

Figure 50:
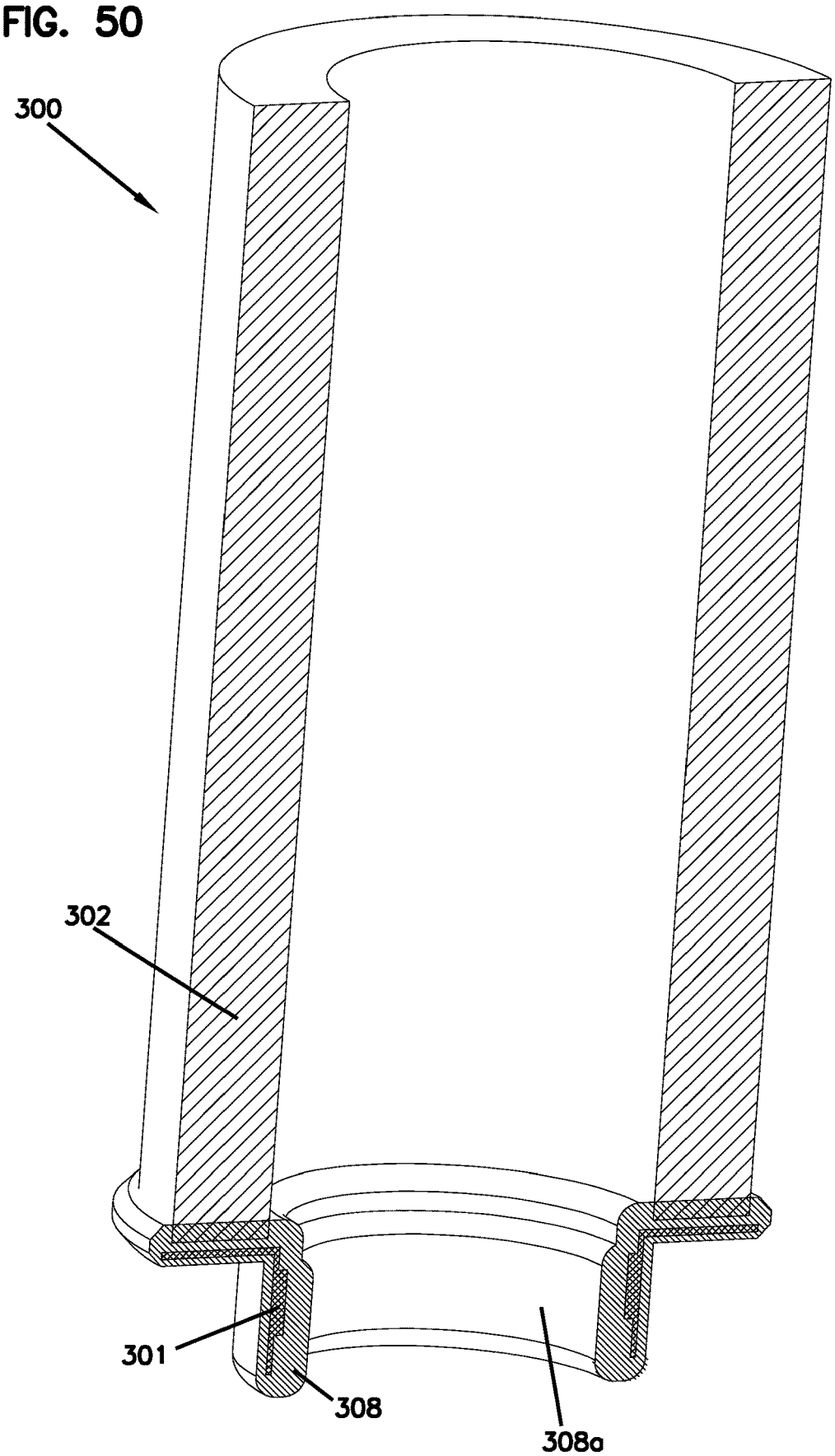
FIG. 50 is a cross-sectional view of a fourth example of a first filter cartridge usable within the air cleaner assembly shown in FIG. 1.
Figure 51:
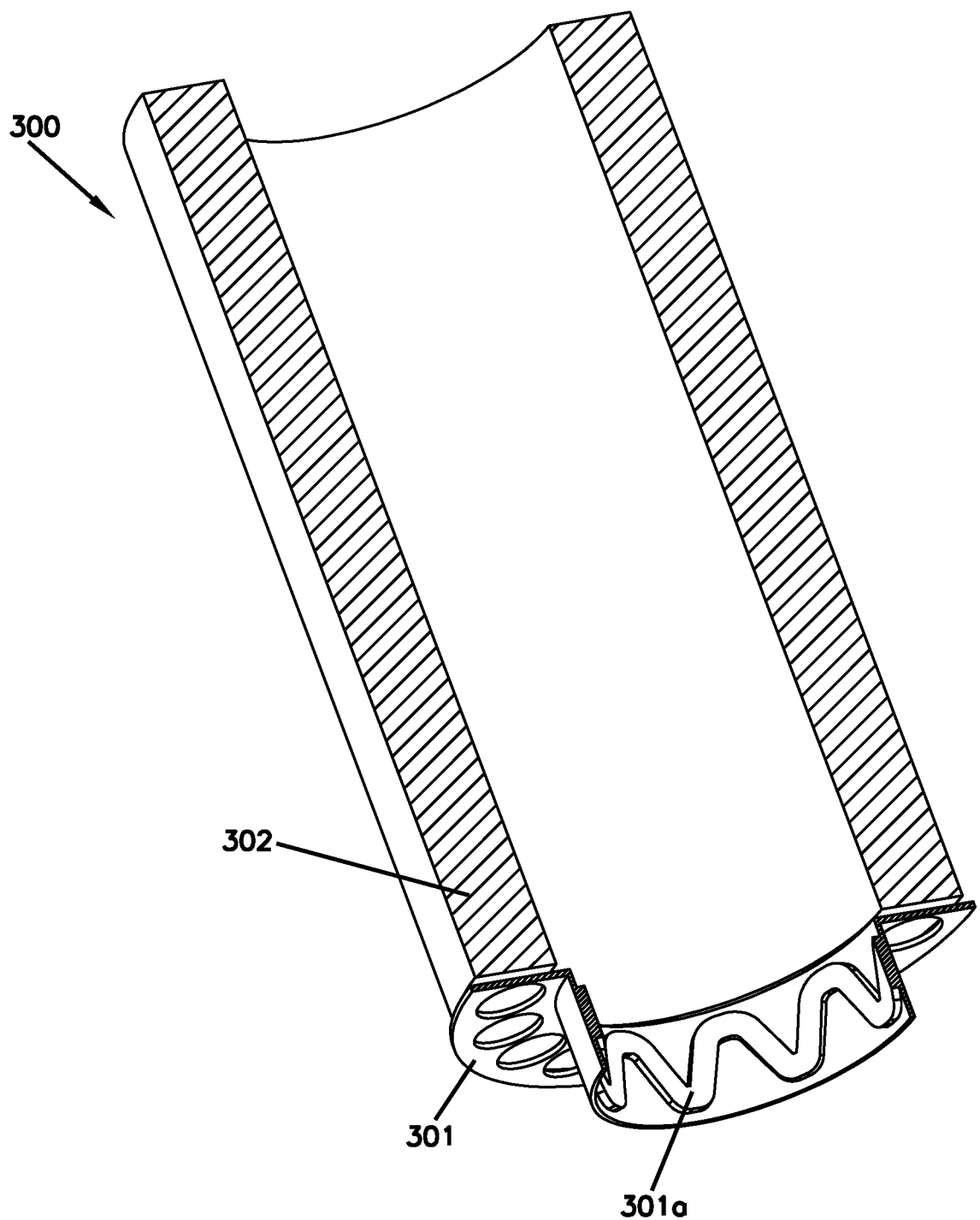
FIG. 51 is a cross-sectional view of the filter cartridge shown in FIG. 50, with the end cap seal member removed.
Figure 52:
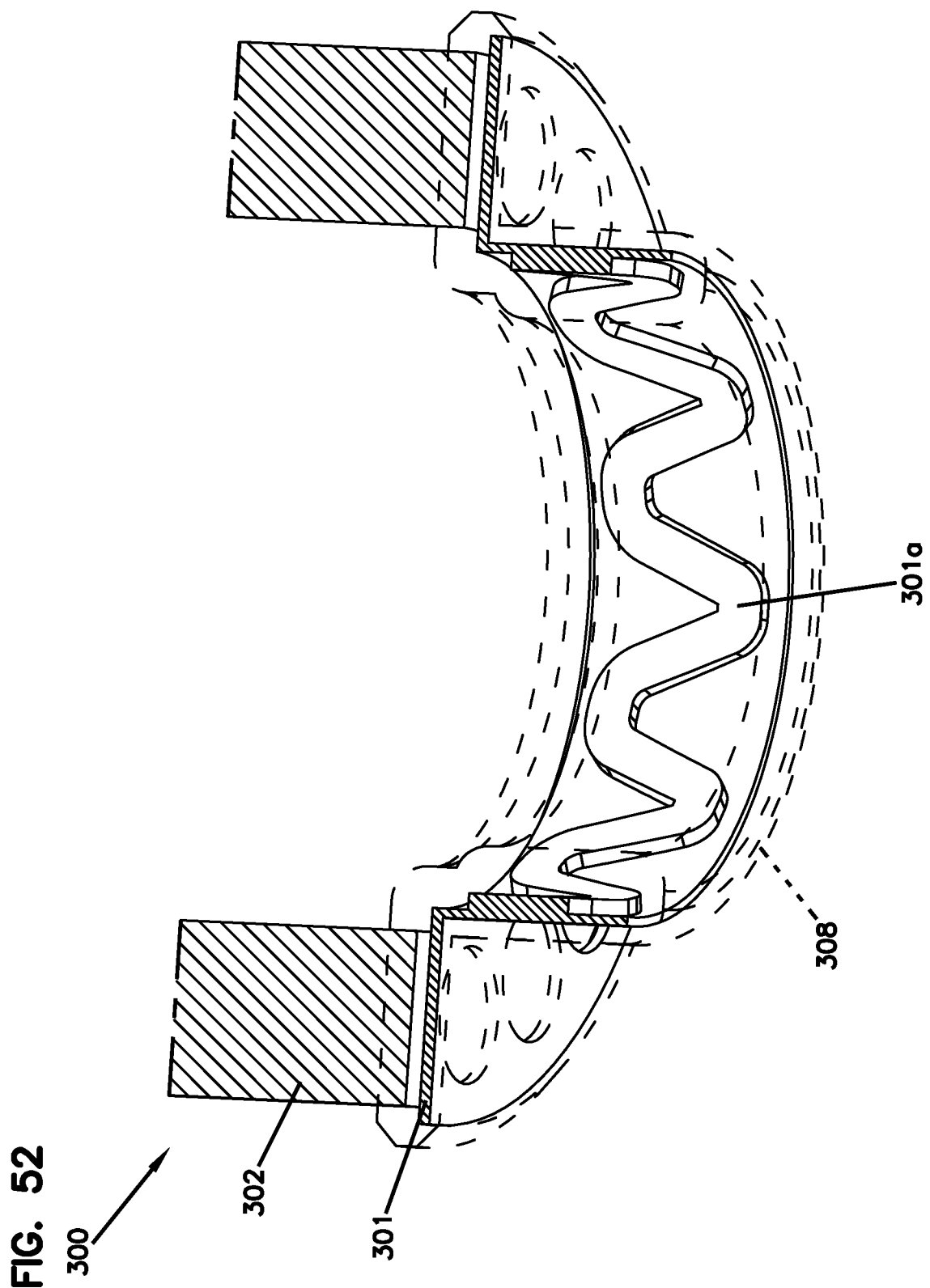
FIG. 52 is a cross-sectional partial view of the filter cartridge shown in FIG. 50, with the end cap seal member shown as being transparent.
Figure 53:
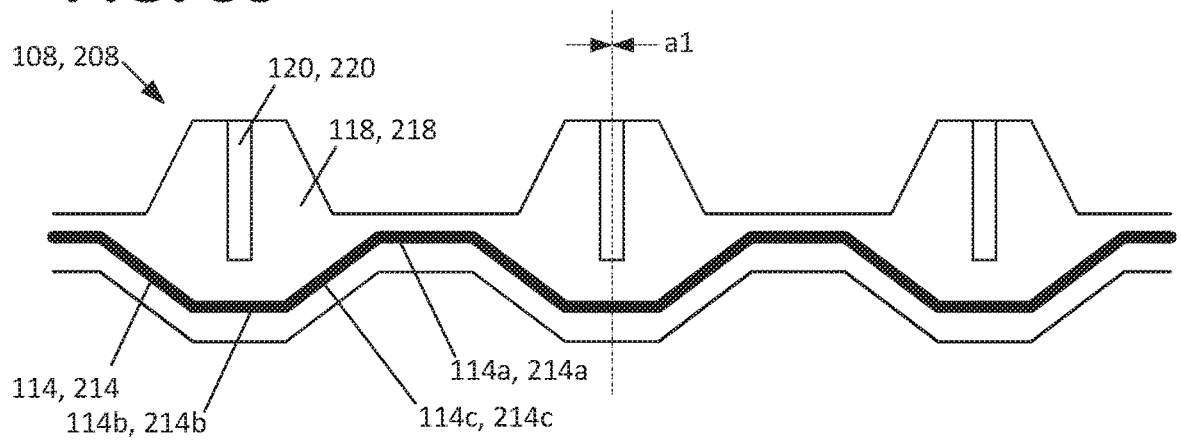
FIG. 53 is a flat schematic view of the seal side of the open end cap of either one of the filter cartridges shown in FIGS. 27, 28, 31, 32, and 41.
Figure 54:
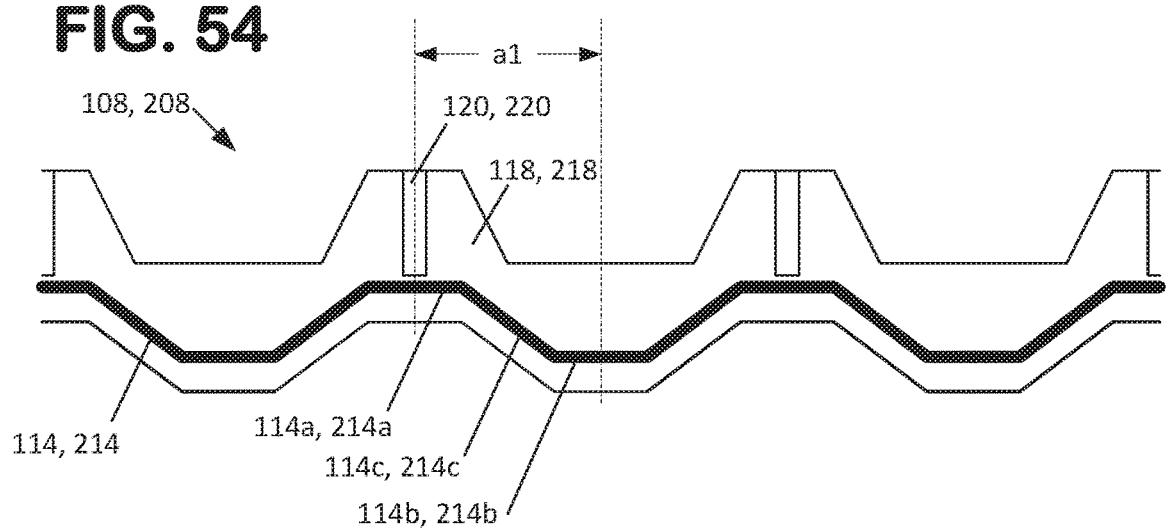
FIG. 54 is a flat schematic view of an alternate open end cap design with features usable with any of the filter cartridges herein.
Figure 55:
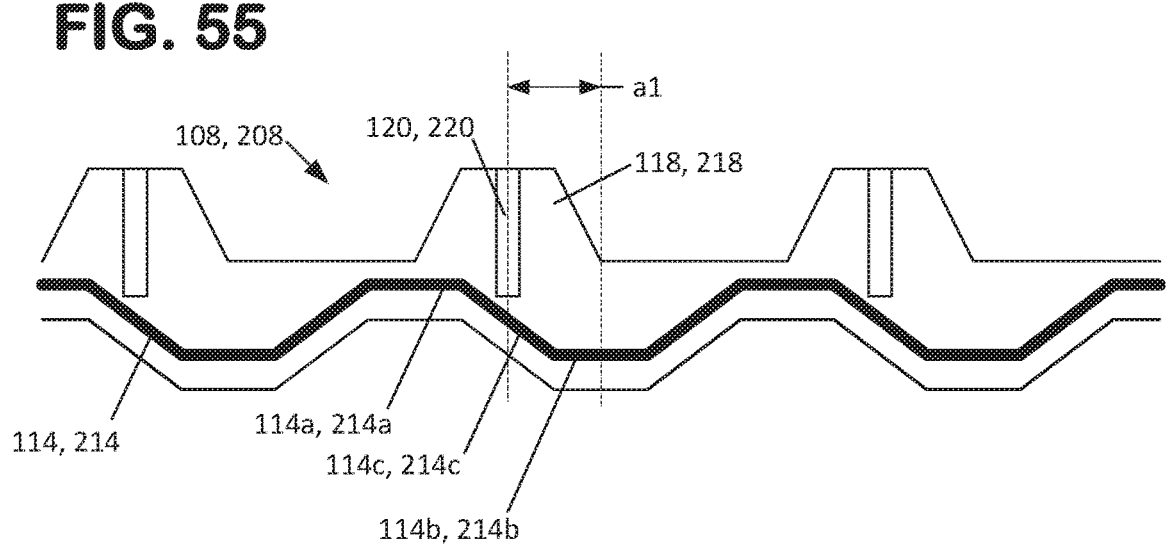
FIG. 55 is a flat schematic view of an alternate open end cap design with features usable with any of the filter cartridges herein.

Referring to FIGS. 50 to 52, a fourth example of a first filter cartridge 300 is shown. In this example, rather than having axially deviating segments, the seal member 308 has a generally smooth surface and presents a radially directed sealing surface 308a. As shown, the seal member 308 is supported by an internal support ring or member 301 about which the seal member 308 can be overmolded. The seal member 308 is sufficiently compressible to conform around the shape of the ribs 54" when installed onto the outlet tube 52". The support ring 301 is shown as being provided with a raised surface 301a with axially deviating segments that correspond to the location seal pathway defined by the outlet tube 52". When the filter cartridge 300 is installed onto the outlet cover 50" such that the axially deviating segments of the outlet tube 52" and the raised surface 301a are aligned, the raised surface 301a acts to pinch the seal member 308 into the seal pathway defined on the outlet tube 52" such that a seal can be formed.

III. Filter Assembly—Second Filter Cartridge 200, 200', 200"

Now referring to the filter cartridge 200 depicted in FIGS. 11-14. The filter cartridge 200 shares many common features with the filter cartridge 100. For such features, the description for the filter cartridge 100 is entirely applicable to filter cartridge 200, and need not be repeated here in great detail. Where similar features do exist, similar reference numbers are used within the series designation (e.g. 202 instead of 102, etc.). Outside of having a smaller overall dimension, such that the filter cartridge 200 can fit within the interior space 102i of the filter cartridge 100, the filter cartridge 200 has an axially deviating seal arrangement 214 that seals against surface 52s2 and recesses or channels 220 in the extension members 118 that are both directed radially outward and are disposed on the outward side of the end cap 208. This is the opposite of the filter cartridge 100 in which the seal arrangement 114 and channels or recesses 120 are directed radially inward and are disposed on the inward side of the end cap 108. The filter cartridge 200 is also shown as having depth media while filter cartridge 100 is shown as having pleated media. Outside of these differences, the filter cartridge 200 has a generally similar construction to the filter cartridge 100. Similar to the seal arrangement 114, seal arrangement 214 is shown as having alternating segments including a first portion 214a, a second portion 214b, and an intermediate portion 214c.

The filter cartridge 200 can be referred to a secondary filter element or as a safety filter element. During the servicing of the filter assembly 1, wherein the primary filter cartridge 100 is removed and replaced with a new or refurbished filter cartridge, the secondary filter element 200 prevents dust or debris from entering into the outlet tube 52. Furthermore, in the event of a malfunction in the primary filter cartridge 100, the secondary filter cartridge 200 is available to prevent dust or debris from entering the outlet tube 52.

The secondary filter cartridge 200 includes a first end 204, and second end 206, and filtration media 202 extending between the first end 204 and the second end 206. In the exemplary secondary filter cartridge 200 depicted, the first end 204 includes a first endcap 208 and the second 206 includes a second end cap 210. The secondary filter cartridge 200 can be provided, if desired, without a second end cap 210. That is, the secondary filter cartridge 200 can be provided so that the media extends over the second end 206. In addition, the secondary filter cartridge 200 can be provided with a screen or support structure(s) 202s extending from the first end 204 to the second 206 to help support the filtration media 202 while allowing gas (air) to pass therethrough. The filtration media 202 can be embedded in the first and second end caps 208 and 210. In addition, the screen or support structure(s) 202s for the filtration media 202 can be embedded in the first and second end caps 208 and 210.

The secondary filter cartridge 200 can be constructed so that the filtration media 202 is configured surrounding an open filter interior 202i. The media 202 can be provided as depth media, although alternatives are possible. For example, the media 202 can be provided as pleated media or as multilayer laminate media such as the media disclosed in PCT Publication No. WO 2015/010085, the entire disclosure of which is incorporated herein by reference. In addition, the media 202 can be provided as the filtration media layer arranged in a wave configuration disclosed in PCT Publication No. WO 2015/010085. The media 202 can be configured in a cylindrical pattern as shown, if desired, although alternatives are possible. For example, the media 202 can be somewhat conical in extension between the opposite ends 204, 206. In addition, the media 202 can be configured with non-circular inner and/or outer perimeters. For example, the media can be configured having an oval, circular, or other cross-sectional configuration.

The second end cap 210 can be provided as a closed end piece or cap, extending completely across the media 202 at the second end 206, closing the second end 206 of the filtration media 202 of the filter interior 202i. The second end cap 210 can include projections 210a that help provide separation and cushioning between the secondary filter cartridge 200 and the primary filter cartridge 100. Furthermore, the second end cap 210 can include a plurality of radially extending ridges to help a user grasp the secondary filter cartridge 200 for assisting with the introduction or removal of the secondary filter cartridge 200 from the filter assembly 1.

The second end piece or cap 210 can be characterized as a closed end piece or cap, i.e. an end cap having no aperture therethrough in communication with the open filter interior 202i. In various alternative configurations, the second end 206 can be provided without an end cap. In one variation of the secondary filter element 200 without a second end cap 210, the filtration media 202 extends over and encloses the second end 206. That is, the filtration media 202 can form the closure at the second end 206 thereby preventing unfiltered air from entering into the open filter interior 202i. In an alternative, the second end 206 can be provided with a seal arrangement that mounts onto a secondary filter element support structure wherein the support structure includes a closed end corresponding to the second end 206 of the secondary filter cartridge 200. A remaining portion of the support structure would be open to flow of gas (air) therethrough. However, the closed end of the support structure would, in combination with the seal at the second end of the secondary filter cartridge 200 prevent unfiltered air from entering into the open filter 202i.

Figure 15:
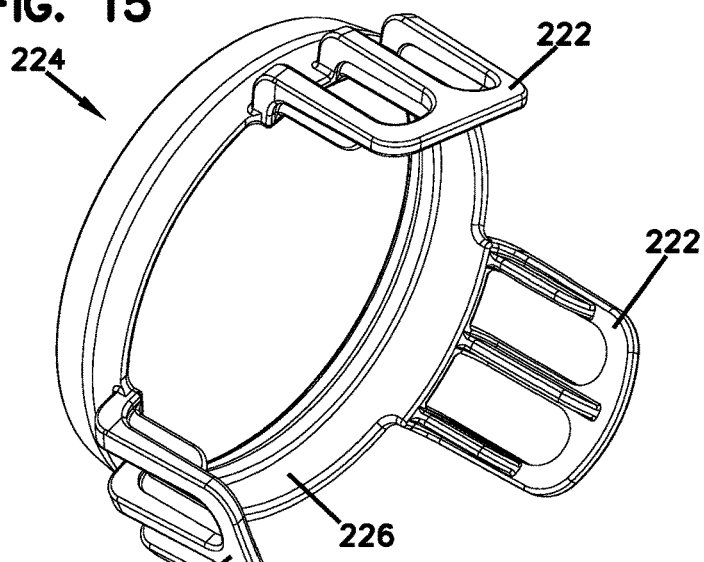
FIG. 15 is a perspective view of a ring member that is a part of the second filter cartridge shown in FIG. 11.
Figure 16:
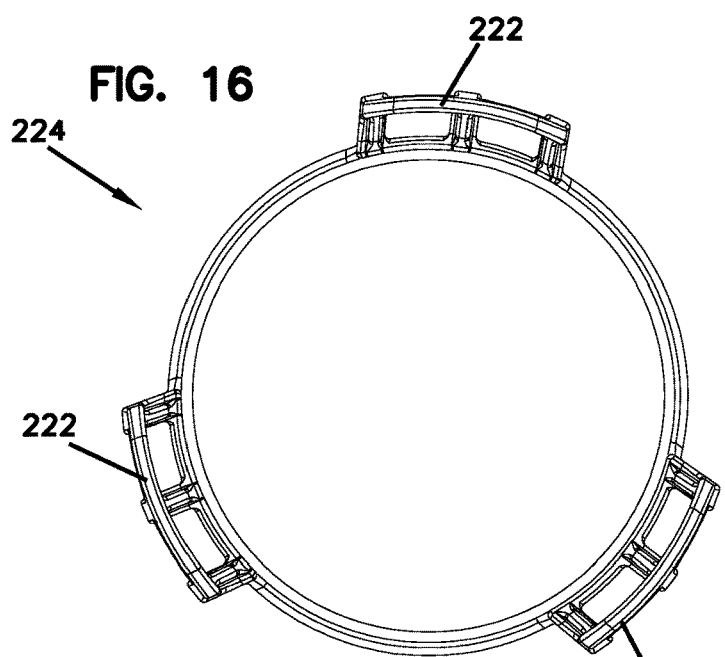
FIG. 16 is a top view of the ring member shown in FIG. 15.
Figure 17:
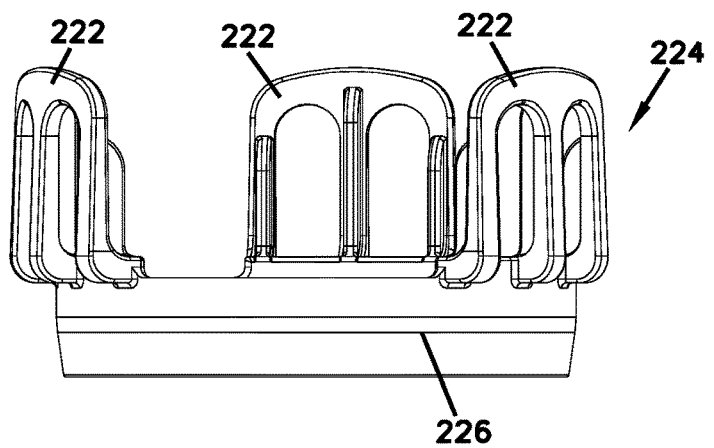
FIG. 17 is a side view of the ring member shown in FIG. 15.

The first end cap 208 includes a support 224 and a secondary seal member 214. The support 224, which provides guide surface 222, can be provided as part of the screen or support structure 202s or the support 202s can be provided as a separate component such as a plastic preform, as shown at FIGS. 15-17. Additionally, the screen(s) 202s extends into the end cap 208 a sufficient amount to help support the secondary seal member 214 when provided in a sealing relationship with the housing outlet cover 50. The support or screen(s) 202s helps support the secondary seal member 214 when it engages the outlet tube 52. The secondary seal member 214 can be referred to as a housing seal structure or arrangement for the secondary filter cartridge 200. As with the seal arrangement 114, the seal arrangement 114 has a stepped profile and has an axially deviating profile into which channels or recesses 220 extend.

In general, the secondary seal member 214 can be molded integrally with the end cap 208 and provides an outwardly directed sealing surface 214s. During operation of the filter assembly 1 when the secondary filter cartridge 200 is installed, air passes through the filtration media 202 (after having passed through media 102) into the open filter interior 202i, and then passes through the central open volume defined by the outlet tube 52.

Figure 11:
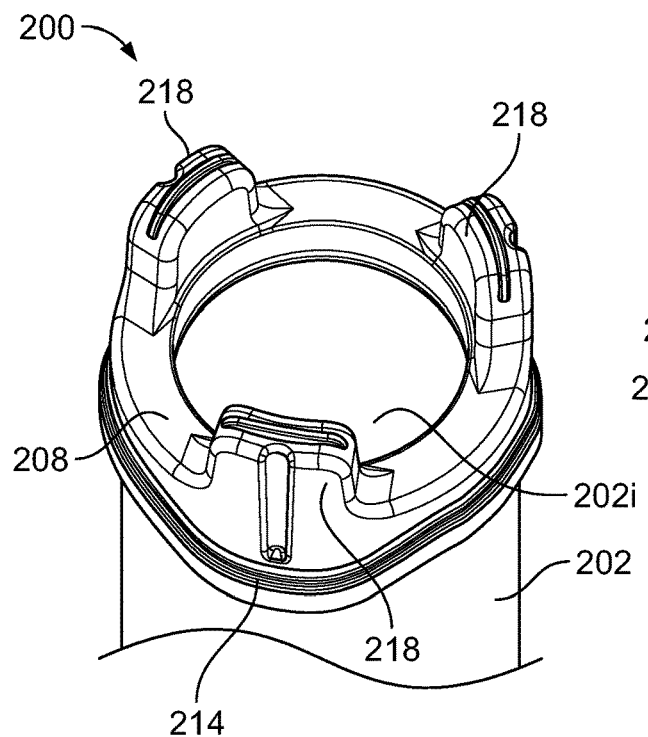
FIG. 11 is a perspective view of a portion of the second filter cartridge shown in FIG. 3.
Figure 12:
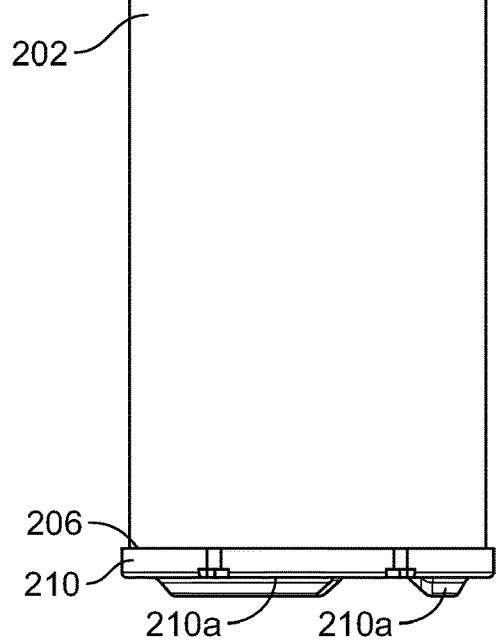
FIG. 12 is a side view of the second filter cartridge shown in FIG. 11.
Figure 13:
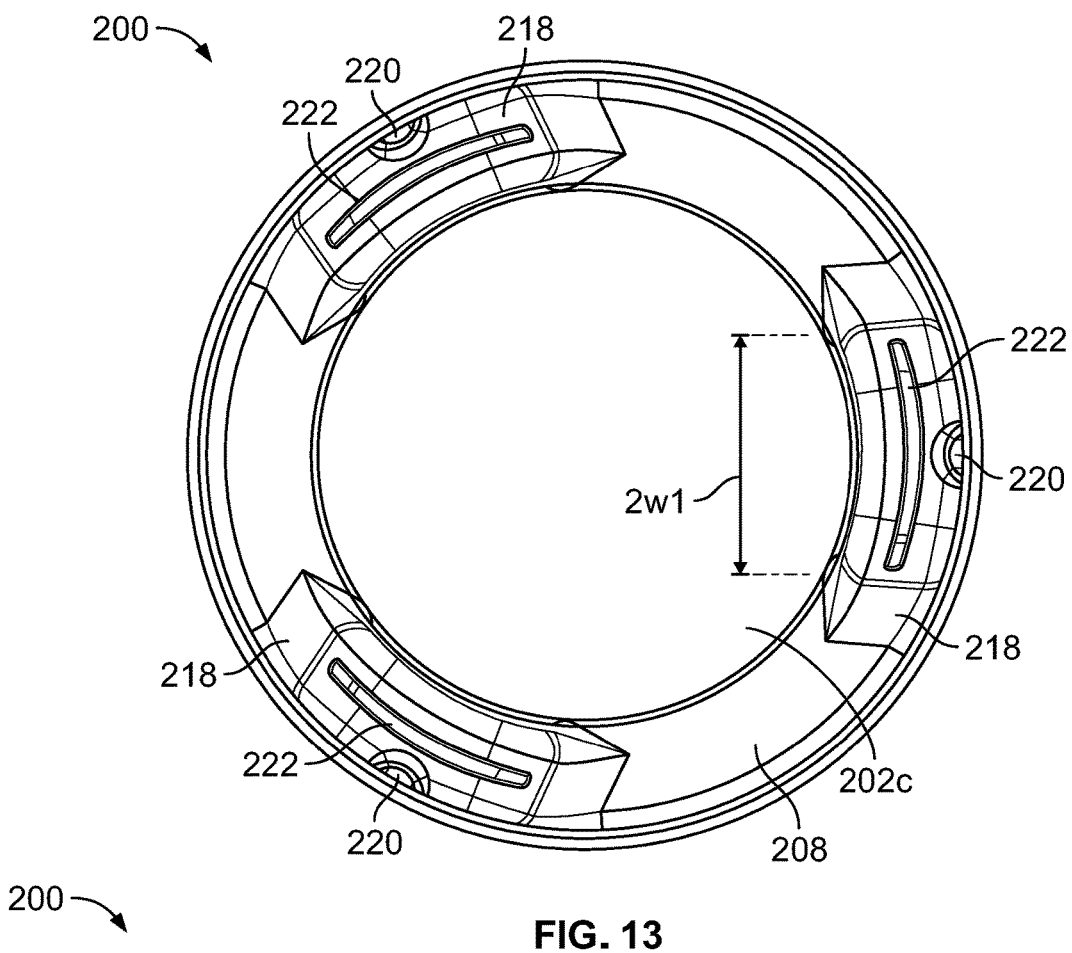
FIG. 13 is a top view of the second filter cartridge shown in FIG. 11.
Figure 14:
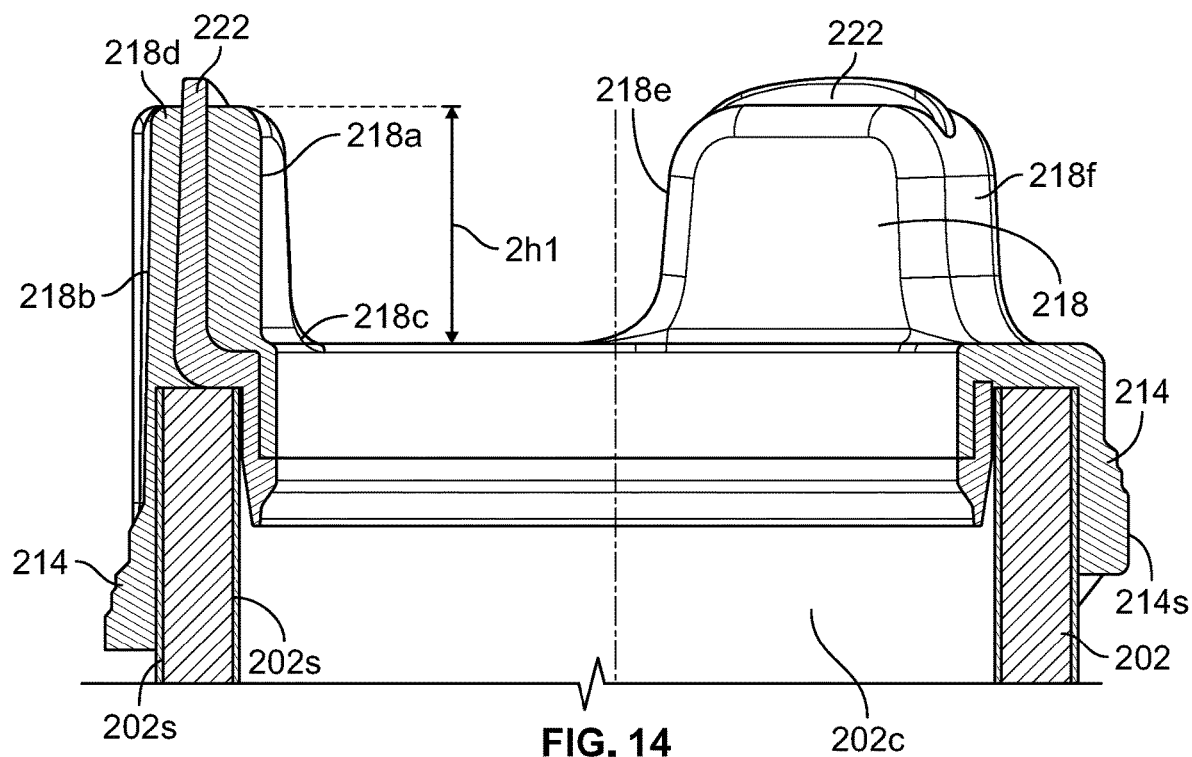
FIG. 14 is a cross-sectional side view of the second filter cartridge shown in FIG. 11.

As can be most easily seen at FIGS. 11 and 12, the outwardly directed channels or recesses 220 extend from a distal end 220a proximate the distal end 218d of the extension members 218 to a base end 220b proximate the second sections 214b of the seal arrangement 214. As with filter cartridge 100, the alignment of the channels or recesses 220 and the second sections 214b is not required, but such an arrangement would add height to the structure.

Referring to FIGS. 18-20, the outlet cover 50 can be seen as having recesses 58 with sidewalls 58a, 58b and walls 58c, 58d sloping towards the sidewalls 58a, 58b. Axially extending ribs 60, which extend between a distal end 60a and a base end 60b, are also provided along the interior side of the outlet tube 52. The extension members 218 and guide members 222, along with channels or recesses 220 interact with the recesses and walls 58a-58d in the same manner as previously described for filter cartridge 100 and recesses 56. Reference can be made again to FIGS. 24-26 which shows the sequential installation of the filter cartridge 200, the principles of which are equally applicable for filter cartridge 100.

Figure 33:
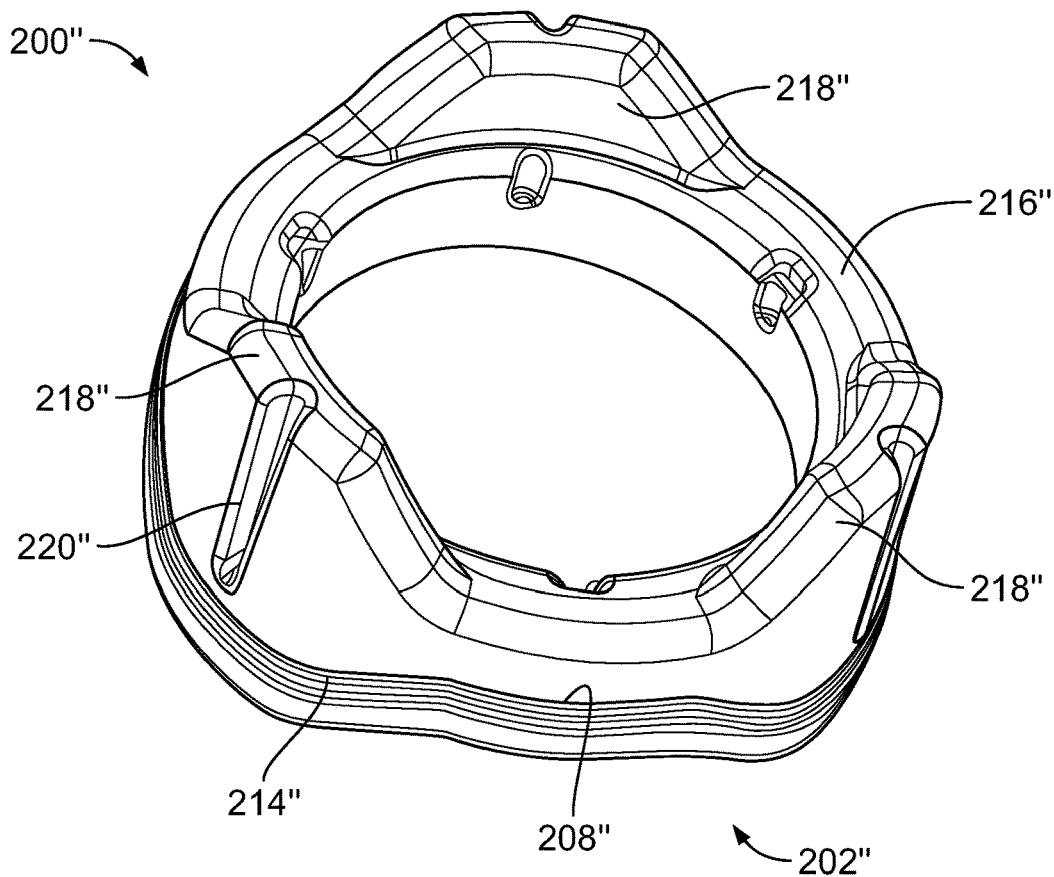
FIG. 33 is a perspective view of a third example of a second filter cartridge usable within the air cleaner assembly shown in FIG. 1.
Figure 34:
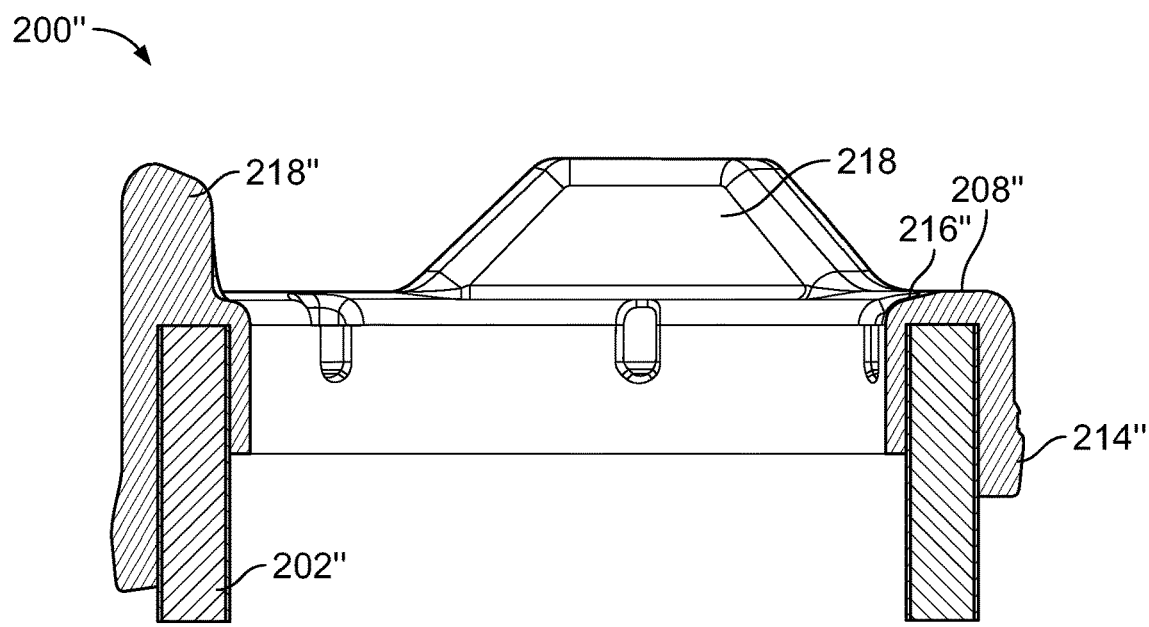
FIG. 34 is a cross-sectional side view of the second filter cartridge shown in FIG. 33.

Alternate examples of second filter cartridges are shown at FIGS. 31-32 (filter cartridge 200') and at FIGS. 33-34 (filter cartridge 200"). The filter cartridges 200' and 200" share many common features with the filter cartridge 200. For such features, the description for the filter cartridge 200 is entirely applicable to filter cartridges 200' and 200", and need not be repeated here. Where similar features do exist, similar reference numbers are used. The description for filter cartridges 200', 200" will be directed to the differences between the filter cartridges.

Figure 38:
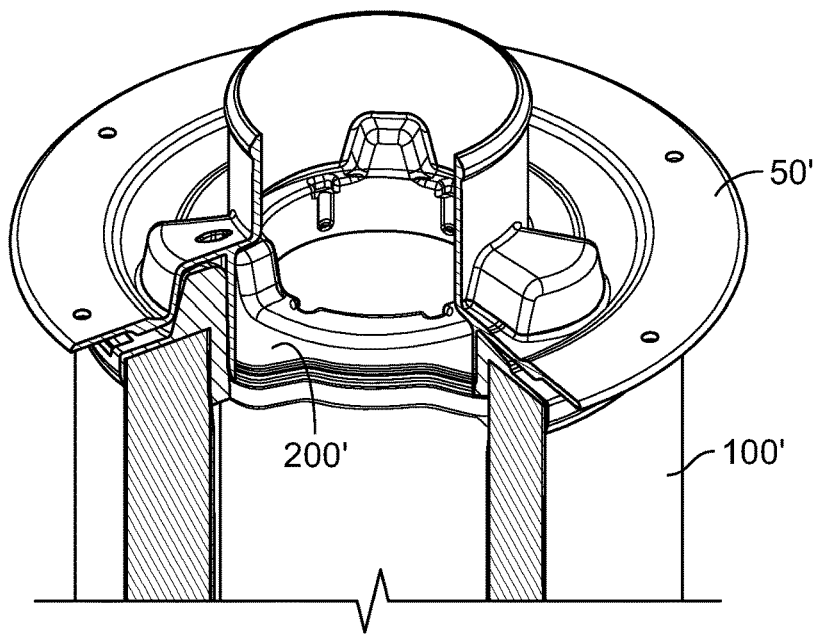
FIG. 38 is a cut-away sectional perspective view of the first filter cartridge, second filter cartridge, and outlet cover respectively shown in FIGS. 27, 31, and 35 in an assembled state.
Figure 39:
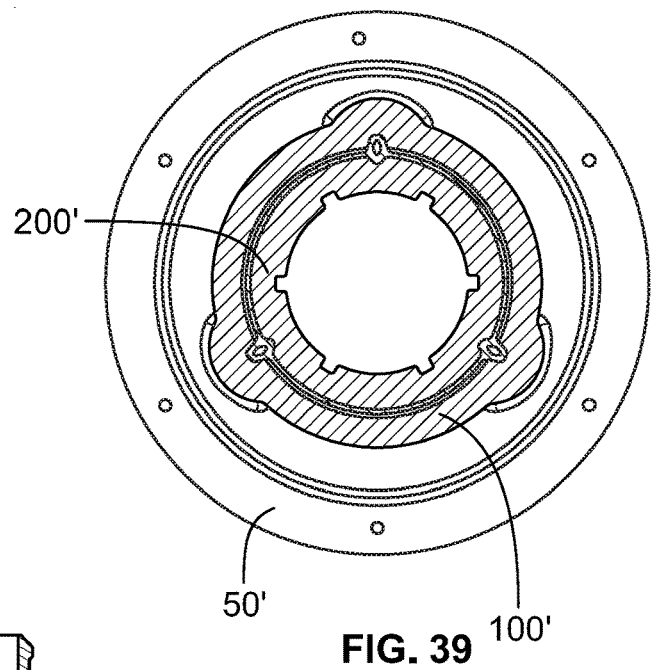
FIG. 39 is a cross-sectional top view of the assembly shown in FIG. 38.
Figure 40:
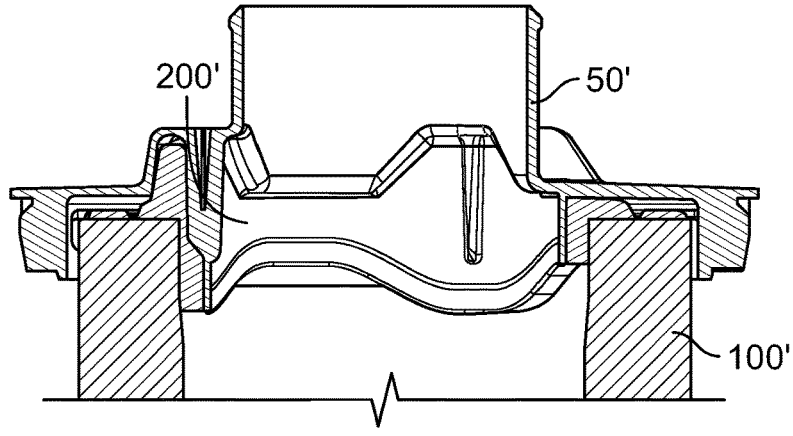
FIG. 40 is a cross-sectional side view of the assembly shown in FIG. 38.
Figure 41:
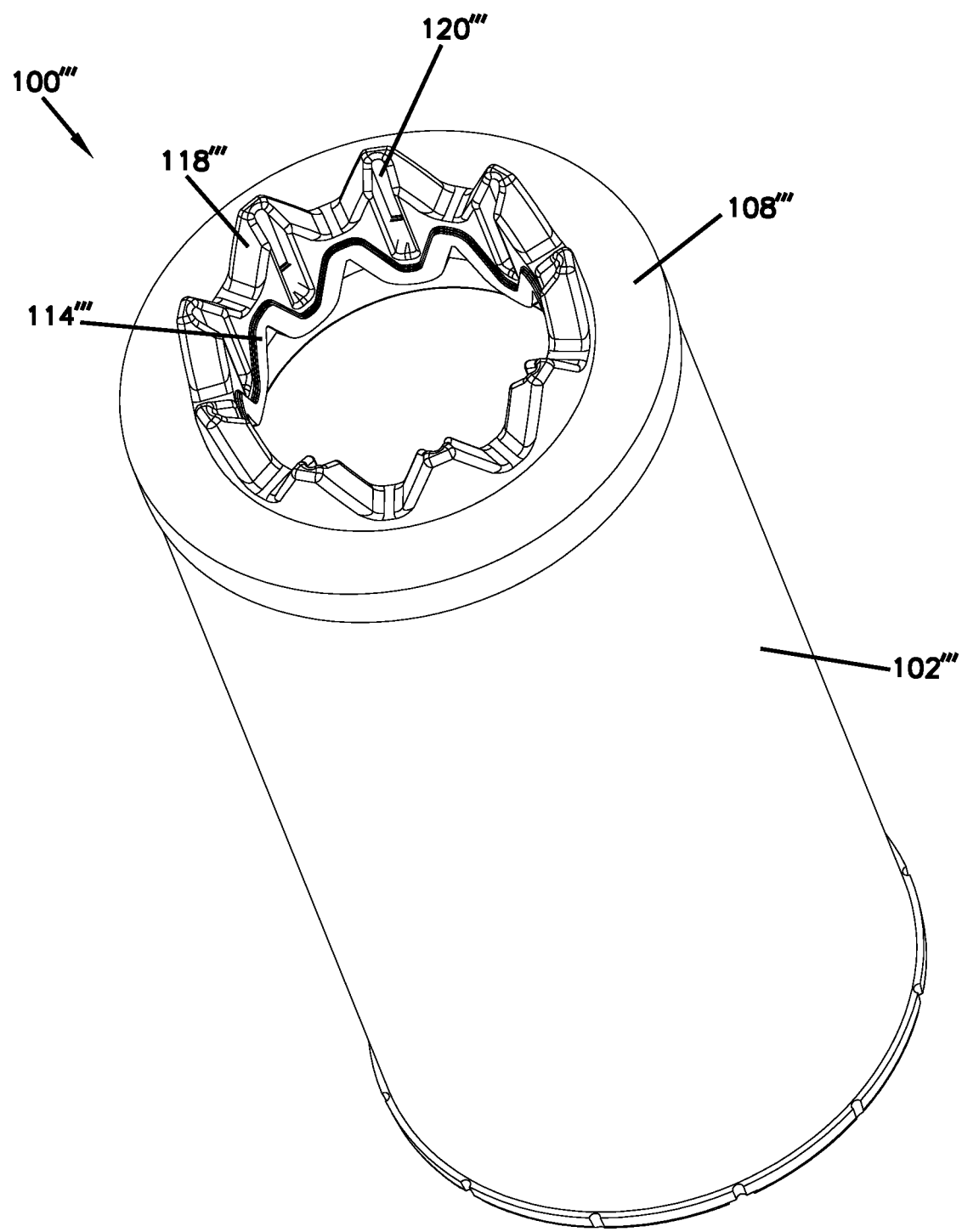
FIG. 41 is a perspective view of a third example of a first filter cartridge usable within the air cleaner assembly shown in FIG. 1.
Figure 42:
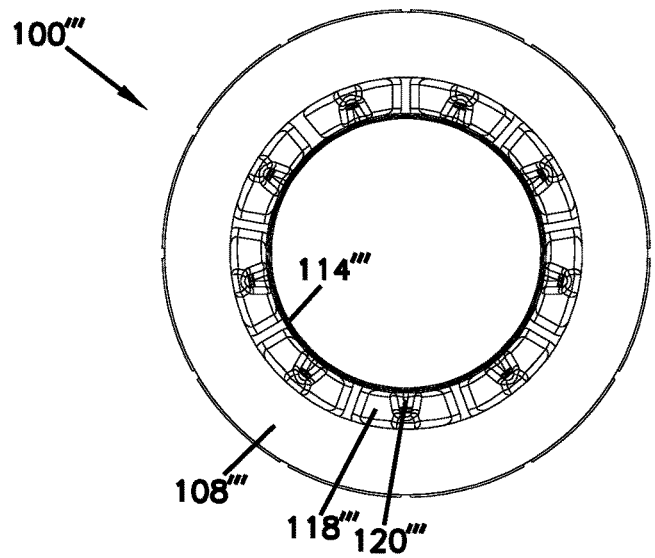
FIG. 42 is a top view of the filter cartridge shown in FIG. 41.
Figure 43:
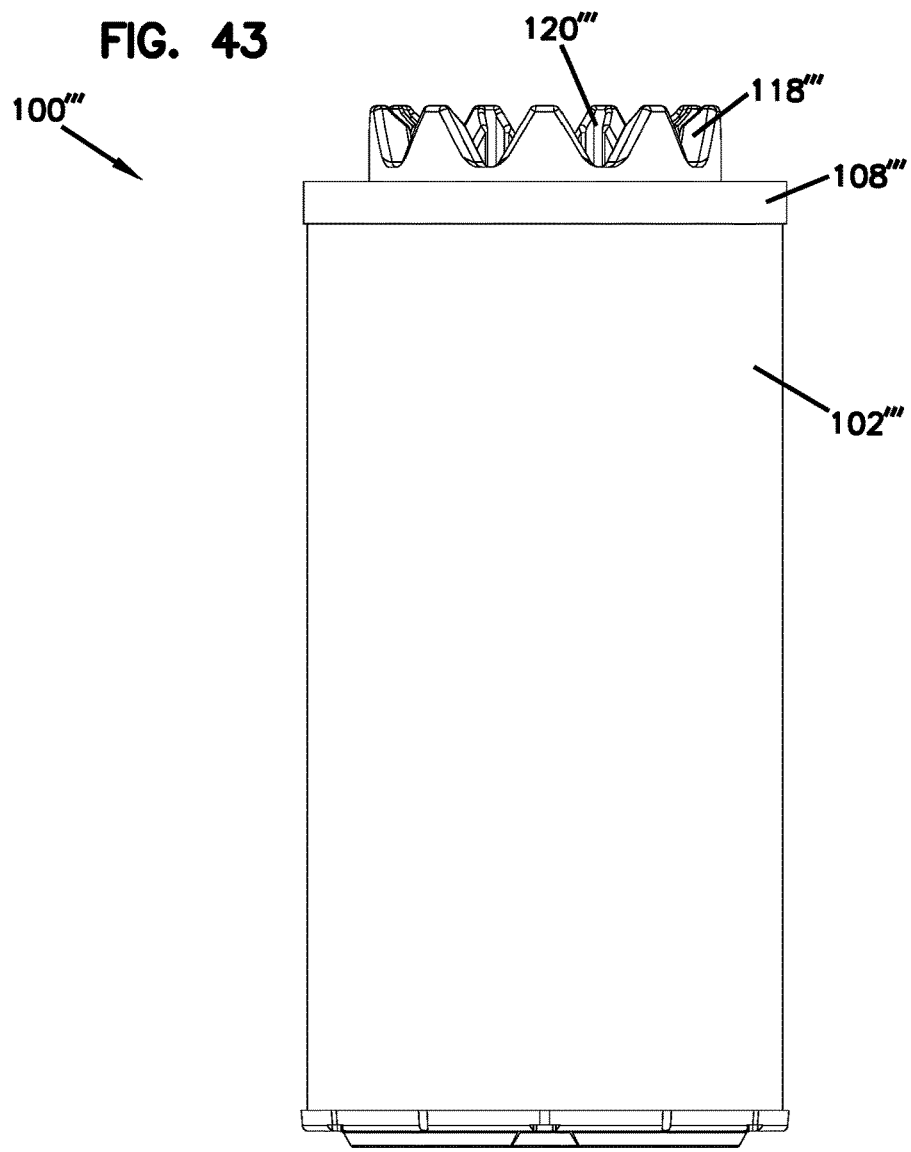
FIG. 43 is a side view of the filter cartridge shown in FIG. 41.
Figure 48:
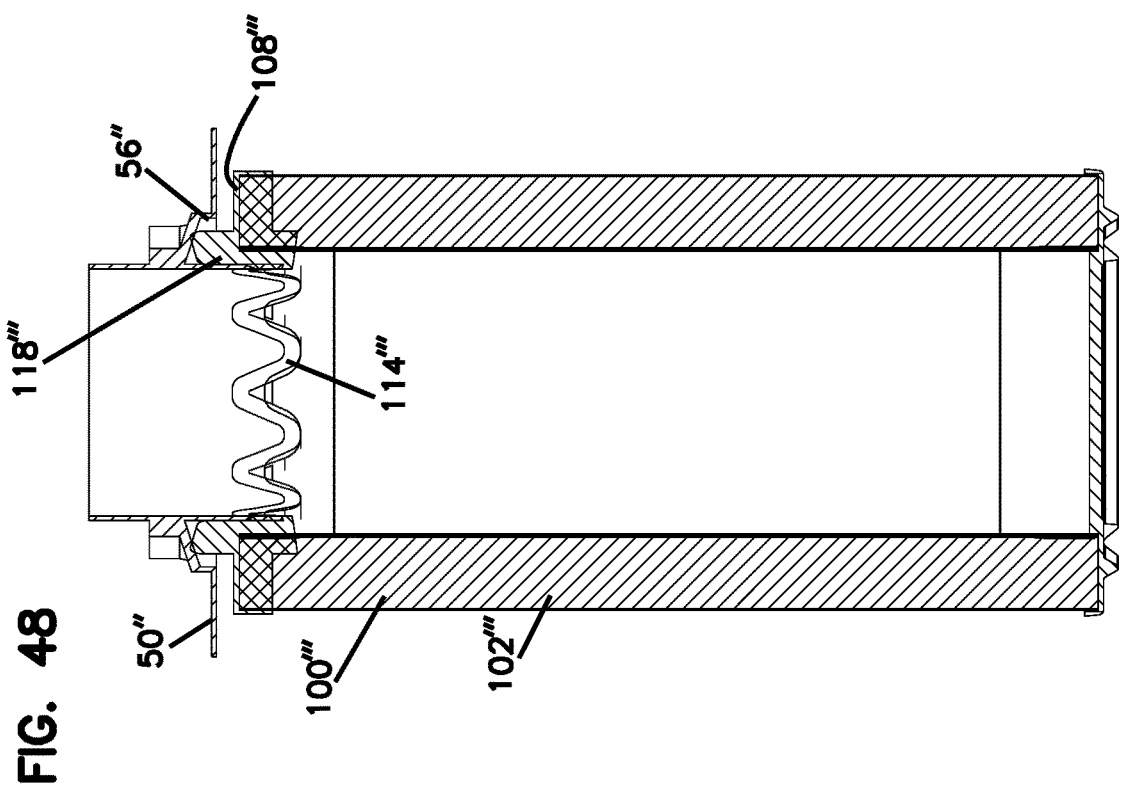
FIG. 48 is a cross-sectional side view of the outlet cover shown in FIG. 45 with the filter cartridge of FIG. 41 installed therein.
Figure 47:
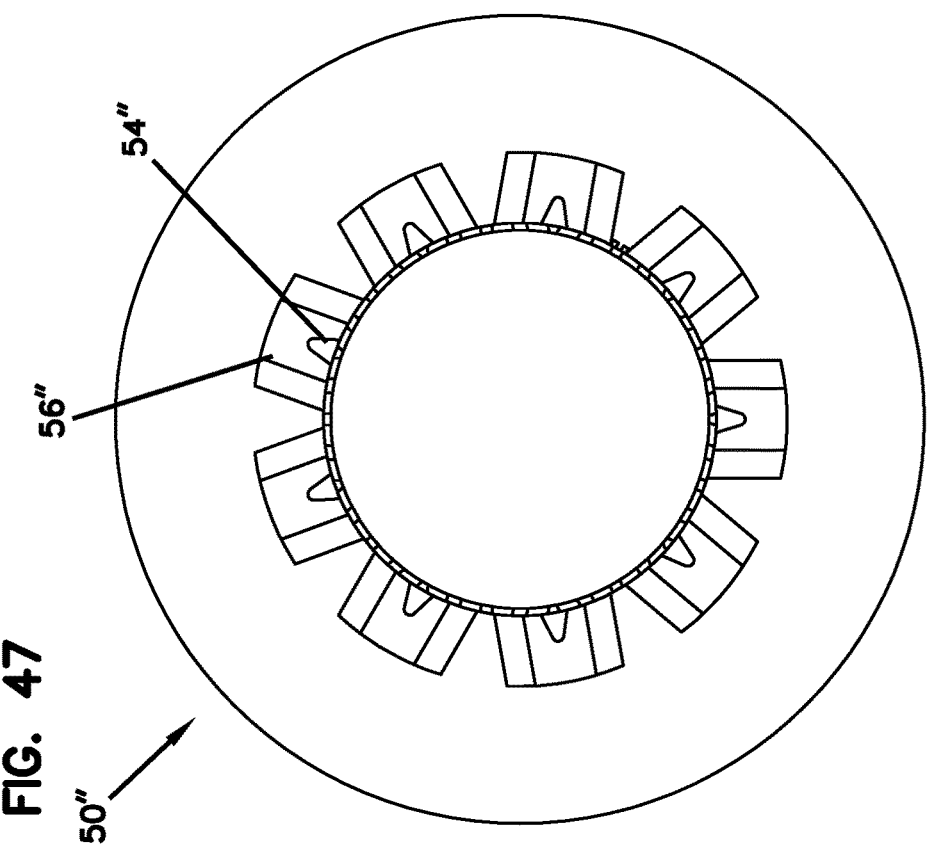
FIG. 47 is a bottom view of the outlet cover shown in FIG. 45.

One such difference is that the guide members 222 are not provided for filter cartridge 200'. As such, the channels or recesses 220 are responsible for ensuring initial alignment of the extension members 218 until they are received within recesses 58' of the outlet cover 50'. The extension members 218' also have a slightly different shape with a lower height to width ratio, as compared to extension members 218. FIGS. 38-40 show the filter cartridges 100' and 200' in an assembled state with respect to the outlet cover 50'.

As with filter cartridge 200', filter cartridge 200" is provided without guide members 222. The primary remaining difference for filter cartridge 200" is that the extension members 218 are provided with a much greater width and the sidewalls of the extension members 218 are sloped at a greater angle towards each other. Accordingly, there is relatively less space between the extension members 218" in comparison to the first two embodiments. To accommodate the greater width extension members 218" of filter cartridge 200", the outlet cover recesses can be provided with a similar shape.

Figure 21:
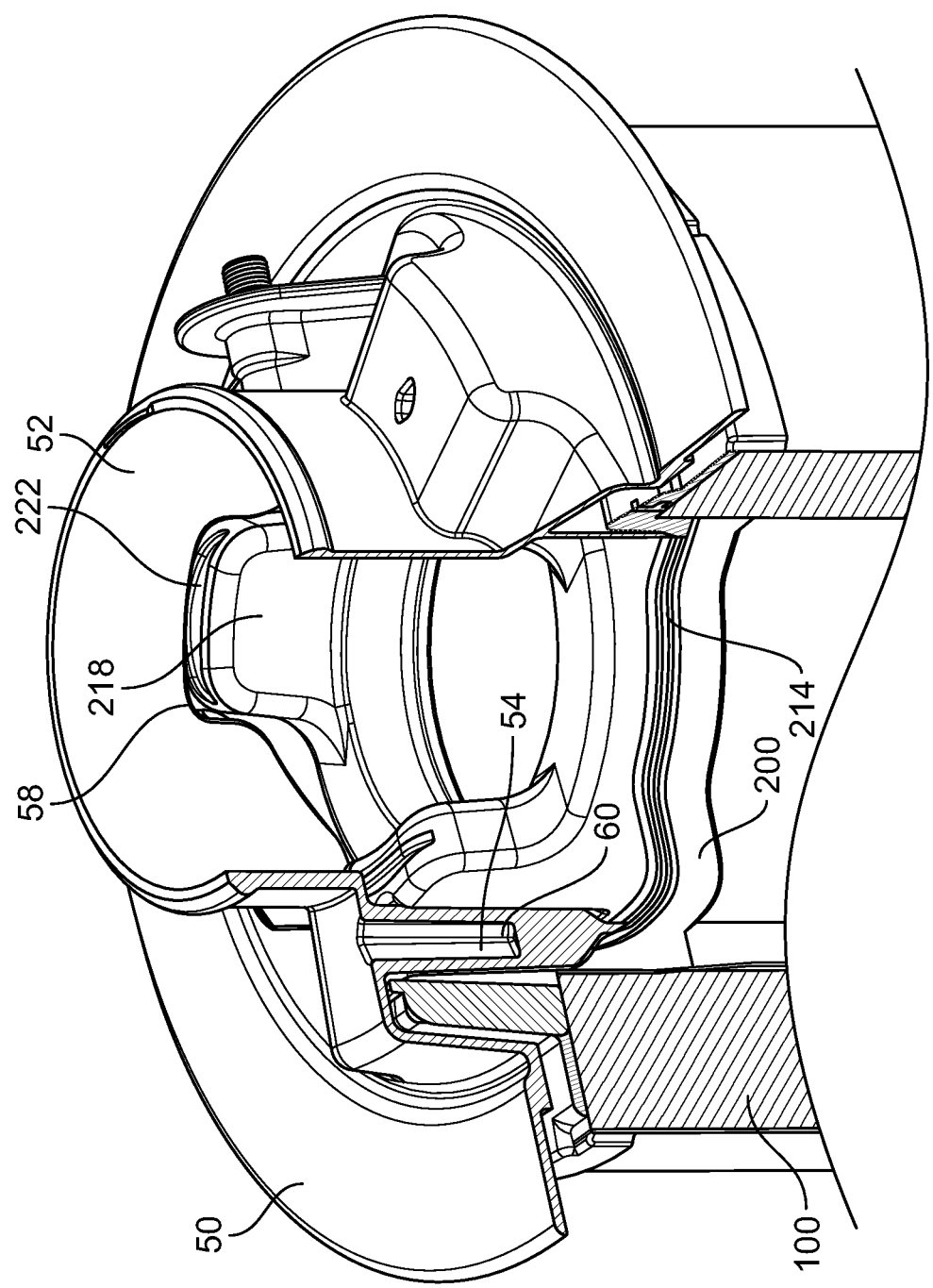
FIG. 21 is a cut-away sectional perspective view of the first filter cartridge, second filter cartridge, and outlet cover shown in FIG. 3 in an assembled state.
Figure 22:
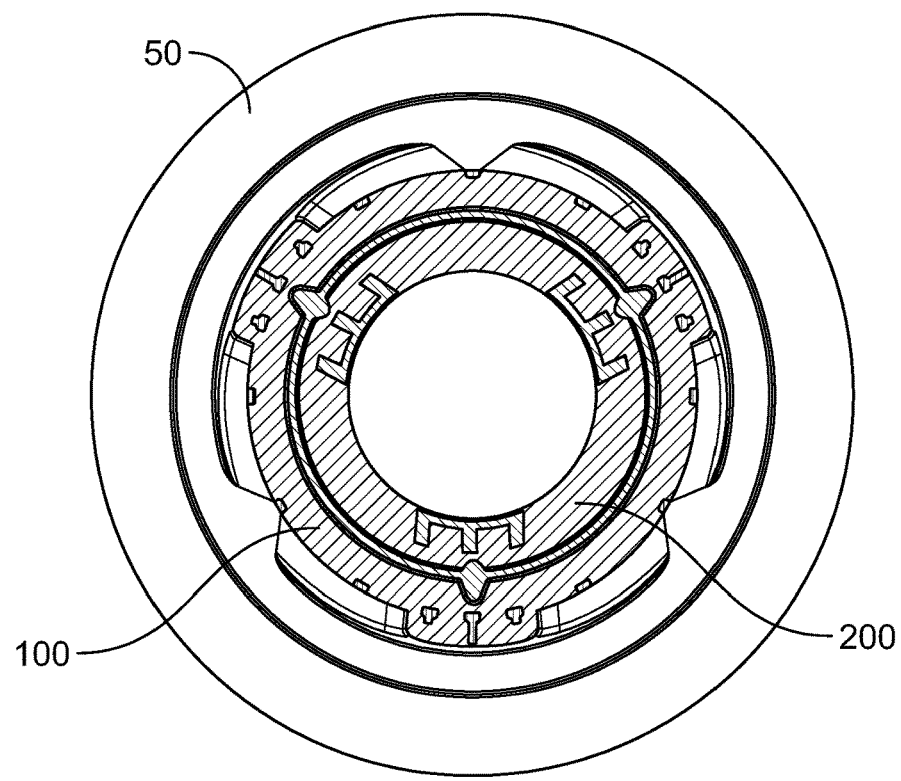
FIG. 22 is a cross-sectional top view of the assembly shown in FIG. 21.
Figure 23:
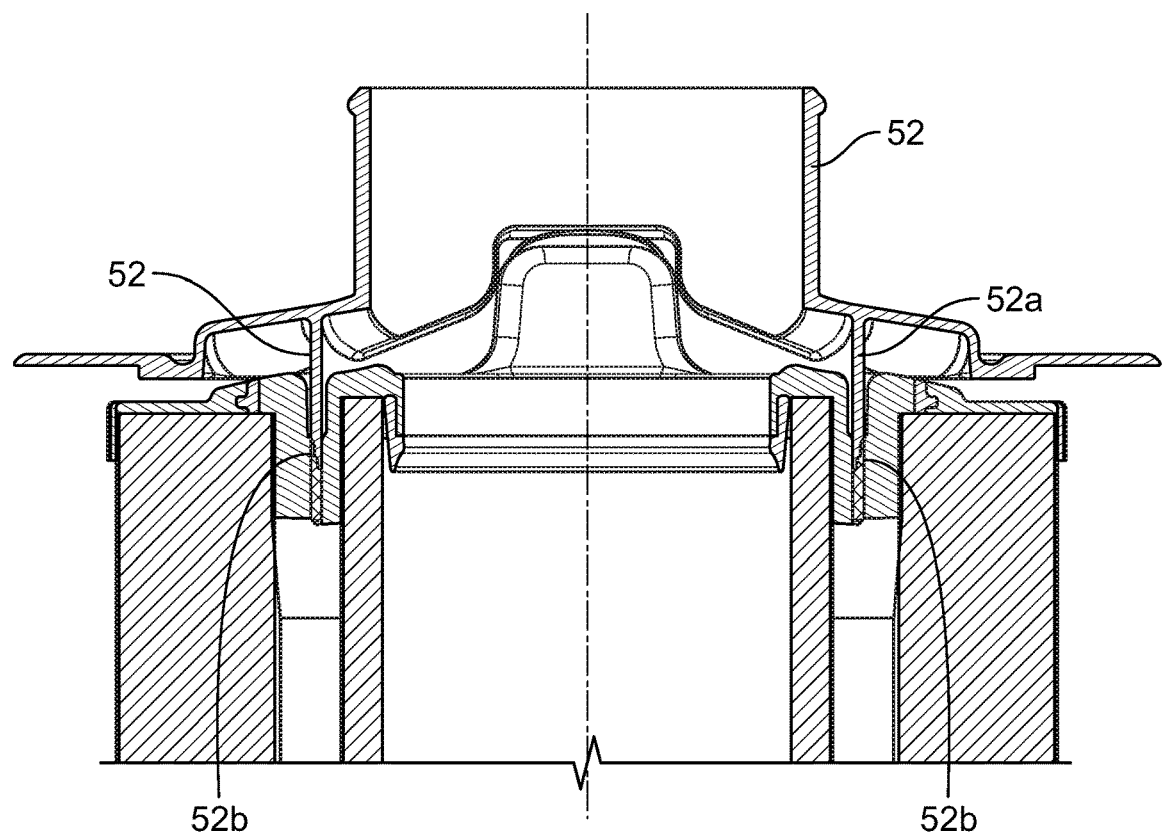
FIG. 23 is a cross-sectional side view of the assembly shown in FIG. 22.

Referring to FIGS. 21-23, the filter cartridges 100, 200 are shown in a fully installed state with respect to outlet cover 50. As can be appreciated from these views, it can be seen that that the filter seal arrangements 114, 214 seal against a common wall 52 of the outlet cover 50 in which the axially extending ribs 54, 60 are directly opposite each other. With such an arrangement, the extension members 118, 218 are likewise opposite each other and are received within oppositely aligned recesses or pockets 56, 58. Although such an alignment is not necessarily required, the resulting construction of the outlet cover 50 is less complex when the outlet cover 50 receives aligned cartridges 100, 200. As can be most easily seen at FIGS. 18 and 23, the outlet tube wall 52a against which the seal arrangements 114, 214 form a seal has an axially varying profile at end 52b. This axially varying profile matches the axially varying profile of the seal arrangements 114, 214. Thus, proper sealing can only be obtained when the filter cartridges 100, 200 are rotated such that the seal arrangements 114, 214 are properly aligned and in phase with the outlet tube wall 52a. Also, because the profile at end 52b matches the profile of the seal arrangements 114, 214, the seal arrangements 114, 214 do not need to be inserted deeply into the tube wall 52a during installation, which would be required if the end 52b had a straight profile. This configuration avoids significant frictional forces that would otherwise exist if the end 52b had a straight profile that would impede the ability of the filter cartridge 100, 200 to automatically rotate as an installer pressed the filters axially into the housing. The alignment of the filter cartridges is ensured by the interaction of the extension members 118, 218 within recesses or pockets 56, 58 and/or by the interaction of the ribs 54, 60 within the channels or recesses 120, 220. It noted that the filter cartridges 100, 200 could be provide could be provided with only the channels or recesses 120, 220 or with only the guide members 122, 222 as each of these structures serves such an alignment function.

Although specific examples for the first and second filters 100, 200 including many or all of the above described features, many combinations of features are possible although a reduction in some functionality or performance may result. For example, a filter cartridge can be provided that includes an axially varying seal arrangement and axially extending channels within the end cap with or without the presence of the extension and guide members. In one example, a filter cartridge can be provided that includes the extension members and axially extending channels with or without a seal arrangement that varies axially and with or without the guide members. In one example, a filter cartridge can be provided that has the extension members and guide members with or without a seal arrangement that varies axially and with or without the axially extending channels. The housing and/or outlet cover can likewise be provided with or without the corresponding features that interact with such filter cartridge arrangements. For example, the outlet cover can be provided without the ribs if axially extending channels are not present in the filter cartridge. Similarly, where the extension members are not provided on the filter cartridge, the outlet cover can be provided without the recesses into which the extension members extend.

IV. Filtration Media and Terminology

As noted previously, the disclosed filter cartridges 100, 100', 100", 100''', 200, 200', and 200" can be provided with different numbers and configurations of extension members and recesses. Referring to FIGS. 49-59, "flat" schematic depictions of the seal side surface of various extension member and recess configurations. Although "100" and "200" series numbers are used in FIGS. 49-59 are shown, the features shown in FIGS. 49-59 are applicable to any of the filter cartridges disclosed herein.

With reference to FIG. 49, a configuration is shown which depicts the already shown and described filter cartridges 100, 100', 100''', 200, 200', 200" in which three extension members 118, 218 and recesses 120, 220 are provided. In such configurations, the extension members 118, 218 and recesses 120, 220 are aligned with the seal member 114, 214 at the second seal portions 114b, 214b such that a rotational angle a1 between the extension members 118, 218 and recesses 120, 220 and the second seal portions 114b, 214b is zero. FIG. 50 shows a configuration in which the angle a1 is increased to 180 degrees such that the extension members 118, 218 and recesses 120, 220 are aligned with the seal member 114, 214 at the first seal portions 114a, 214a. FIG. 51 shows a configuration in which the angle a1 is 90 degrees such that the extension members 118, 218 and recesses 120, 220 are aligned with the seal member 114, 214 at a location halfway between the first seal portions 114a, 214a and the second seal portions 114b, 214b. Other offset angles between the extension members/recesses and the seal portions are possible.

Figure 56:
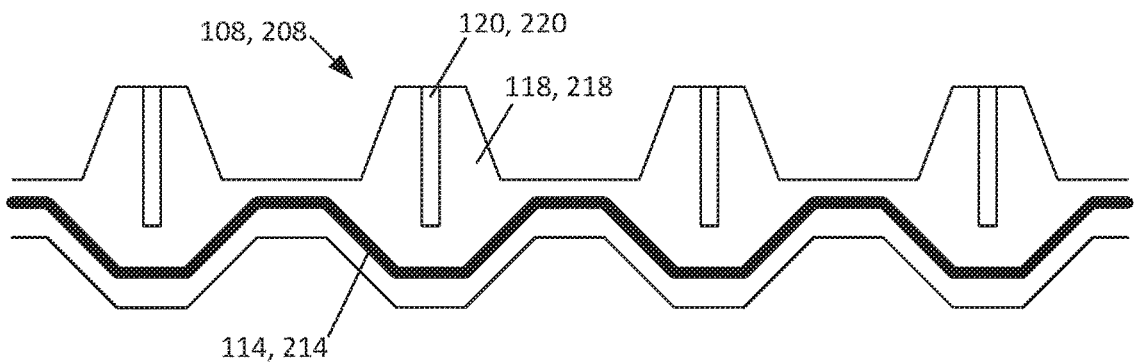
FIG. 56 is a flat schematic view of an alternate open end cap design with features usable with any of the filter cartridges herein.
Figure 57:
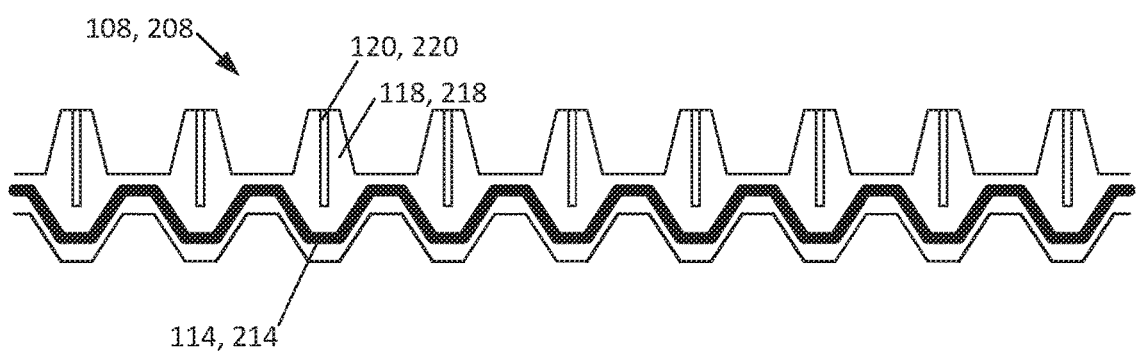
FIG. 57 is a flat schematic view of an alternate open end cap design with features usable with any of the filter cartridges herein.
Figure 58:
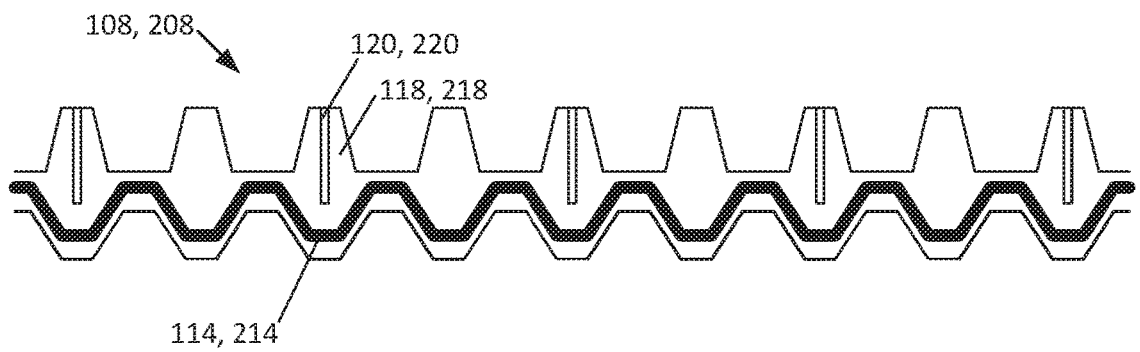
FIG. 58 is a flat schematic view of an alternate open end cap design with features usable with any of the filter cartridges herein.
Figure 59:
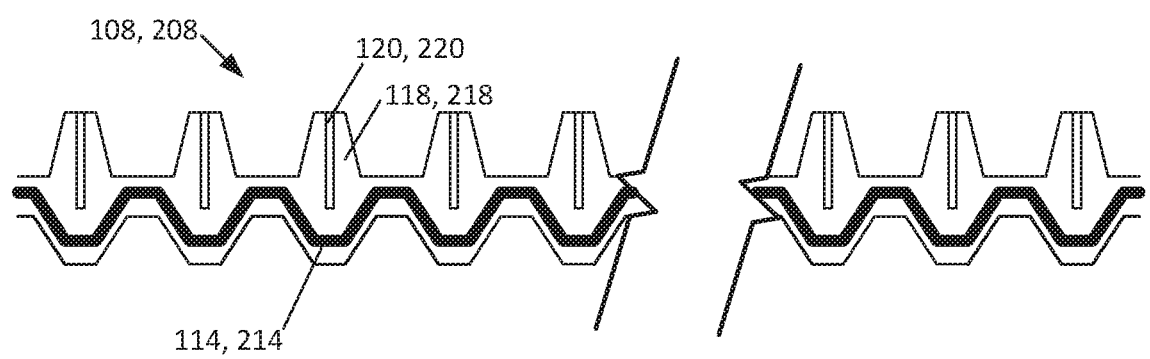
FIG. 59 is a flat schematic view of an alternate open end cap design with features usable with any of the filter cartridges herein.

With reference to FIG. 56, an example end cap 108, 208 is shown that has four extension members 118 and recesses 220 instead of the three shown for the other embodiments. FIG. 57 shows an example end cap 108, 208 having nine extension members 118 and recesses 220. FIG. 58 shows an example end cap 108, 208 similar to that shown for FIG. 57, but where the recesses 120 are provided on only portion of the extension members 118. In the example shown, the recesses 120 are provided on every other extension member 118. Other arrangements are possible, such as providing a recess 120 on one of the extension members 118. In some examples, multiple recesses 120 can be provided on the same extension member 118. In some examples, the recess 120 is offset from the center of the extension member instead of being centered. Any number of suitably sized extension members 120 and recesses 118 may be provided. FIG. 59 shows an example of "n" extension members 120 and recesses 118. The number of extension members 120 and recesses 118 can be a function of the physical size of the filter element, as larger diameter filter elements can accommodate a larger number of extension members 120 and recesses 118. As mentioned in other parts, the spacing between the extension members 120 may also vary and the size and shape of the extension members 120 can vary from one extension member to the other.

V. Filtration Media and Terminology

The particular material chosen for the media is a matter of choice for a selected application. When the filter assembly is an air cleaner, any of a variety of media materials now used in air cleaners can be used with principles according to the present disclosure.

The media pack can comprise only media 102, 202 or the media can be provided with an inner and/or outer liner before installation in the cartridge 100, 200. The media can be pleated, nonpleated, depth media, or wave media although additional alternatives are possible. The media can be provided in a variety of configurations including cylindrical and conical, and with a variety of inner and/or outer perimeter definitions, for example circular or oval.

It is noted that although the seal of the arrangements are sometimes characterized as "radial." However, as a result of the non-circular shape, some of the sealing forces will be directed other than specifically at or away from the central axis X of the cartridge. The seals are nevertheless characterized herein as "radial," since, in general, the seal surfaces on the cartridge and housing are generally radially directed and the sealing forces are either radially outwardly directed or radially inwardly directed, around the axis X, depending on whether an outward or inward seal surface is involved. Alternately stated, the compression forces are still not axial (i.e. in the longitudinal direction of axis X), but rather are generally radial. There are applications, however, where the seal forces are not aligned directly toward or away from the axis X in each of these non-circular configurations.

In more general terms, radial seals comprise seal surfaces that surrounds (directed toward away from) a central axis. That central axis in many instances will comprise a central axis of a filter cartridge around which media is also positioned. However, from alternative arrangements described herein below, it will be understood that a radial seal can be a seal that surrounds an axis that is not also a central axis for the cartridge (by contrast, an axial seal is a seal that is generally aligned with a central axis around which the seal is positioned, typically also, but not necessarily in all instances, a central cartridge axis X).

In the general terminology used herein, the various housing seal arrangements depicted can also be characterized as generally comprising a radially directed seal surface, since the seal direction for the various housing seals depicted in the drawings, is generally with a surface of the seal engaging some portion of the housing (be it a portion of an outlet tube or outer portion of the housing, depending on whether which of the two of the housing seals is involved) that can be generally characterized as a "radially directed surface." In each instance, the surface that actually forms the seal is directed around (and facing toward or away from) a central axis X (typically, also of the cartridge) as opposed to an axial seal which would be generally with seal forces directed in the longitudinal direction of the central axis X. The examples depicted are "outward radial seal surfaces" or "outwardly directed radial seals" since the actual surface of the seal member on the cartridge that will form a seal in engagement with a housing, is generally directed away from a central axis of the cartridge, as opposed as toward the axis. However, many of the principles described herein can be applied in alternate arrangements in which the seal surface on the cartridge that engages the housing to form a seal is directed radially toward the central axis.

The radial housing seals described herein can be generally characterized as "non-clamp," "non-clamping" or "clampless" arrangements or by similar terms. By this it is meant that the seal arrangements typically do not involve the use of a clamp such as a hose clamp or other structure that needs to be tightened in order to provide for a secure seal. Rather, the seals are established by mere installation, with compression of the seal material against a surface of the housing being directed by a cartridge component.

The principles described herein can be applied in a variety of filter assemblies. Examples described in which the principles applied to (air) gas filter assemblies. Examples are described include air filters and crankcase ventilation filter assemblies. The principles can be applied to a variety of alternate gas filtration arrangements, in some instances even with liquid filter assemblies.

Principles according to the present disclosure relate to interactions between filter cartridges and air cleaner systems, in advantageous manners to achieve certain, selected, desired results discussed below. The filter cartridge would generally include a filter media therein, through which air and other gases pass, during a filtering operation. The media can be of a variety of types and configurations, and can be made from using a variety of materials. For example, pleated media arrangements can be used in cartridges according to the principles of the present disclosure, as discussed below.

The principles are particularly well adapted for use in situations in which the media is quite deep in extension between the inlet and outlet ends of the cartridge, but alternatives are possible. Also, the principles are often used in cartridges that relatively large cross-dimension sizes. With such arrangements, alternate media types to pleated media will often be desired.

In this section, examples of some media arrangements that are usable with the techniques described herein are provided. It will be understood, however, that a variety of alternate media types can be used. The choice of media type is generally one of preference for: availability; function in a given situation of application, ease of manufacturability, etc. and the choice is not necessarily specifically related to the overall function of selected ones of various filter cartridge/ air cleaner interaction features characterized herein.

What is claimed:
1. An air filter cartridge comprising:
 a) filter media extending along a longitudinal axis between opposite first and second ends, the filter media defining an open interior volume and an outer perimeter;
 b) an open end cap disposed at the filter media first end;
 c) a seal arrangement disposed on the open end cap, the seal arrangement having a profile varying in an axial direction between a first radial plane and a second radial plane such that a top edge of the profile, at a first circumferential location, is closer to a distal end of the air filter cartridge, as compared to a second circumferential location of the top edge of the profile, wherein at least a portion of the seal arrangement is either disposed within the filter media open interior volume or about the filter media outer perimeter such that at least the second radial plane is axially located between the filter media first and second ends; and d) a plurality of axially extending channels recessed within the open end cap and extending through the first radial plane defined by the seal arrangement, at least some of the plurality of axially extending channels having a radial facing open side, wherein the seal arrangement and the plurality of axially extending channels are located on a common radial side of the open end cap;

e) wherein the seal arrangement and the plurality of axially extending channels are disposed on a radially outward side of the open end cap.

2. The filter cartridge of claim 1, wherein the open end cap is formed from polyurethane.

3. An air filter cartridge comprising:
a) filter media extending along a longitudinal axis between opposite first and second ends, the filter media defining an open interior volume and an outer perimeter;
b) an open end cap disposed at the filter media first end;
c) a seal arrangement disposed on the open end cap, the seal arrangement having a profile varying in an axial direction between a first radial plane and a second radial plane such that a top edge of the profile, at a first circumferential location, is closer to a distal end of the air filter cartridge as compared to a second circumferential location of the top edge of the profile, wherein at least a portion of the seal arrangement is either disposed within the filter media open interior volume or about the filter media outer perimeter such that at least the second radial plane is axially located between the filter media first and second ends;
d) a plurality of axially extending channels recessed within the open end cap and extending through the first radial plane defined by the seal arrangement, at least some of the plurality of axially extending channels having a radial facing open side, wherein the seal arrangement and the plurality of axially extending channels are located on a common radial side of the open end cap; and
e) a plurality of circumferentially spaced extension members extending from an end face of the open end cap, wherein the plurality of axially extending channels are disposed within the extension members, the channels being configured to engage with corresponding ribs provided on a filter assembly housing.

4. The air filter cartridge of claim 3, wherein the seal arrangement and the plurality of axially extending channels are disposed on a radially inward side of the open end cap.

5. The air filter cartridge of claim 3, wherein the seal arrangement and the plurality of axially extending channels are disposed on a radially outward side of the open end cap.

6. The air filter cartridge of claim 3, wherein the open end cap is formed from polyurethane.

7. An air cleaner assembly comprising:
a) an openable housing defining an interior having a radial cavity, the housing including a plurality of axially extending ribs at an outlet end of the housing; and
b) the air filter cartridge of claim 3, the air filter cartridge being removably disposed within the interior radial cavity, wherein the plurality of extension members extend into pockets defined in the housing.

8. The air cleaner assembly of claim 7, wherein at least some of the plurality of extension members are provided with a guide member located at the distal end of the air filter cartridge and wherein the housing outlet end includes one or more guide walls, wherein during installation of the air filter cartridge into the housing, the guide member contacts the one or more guide walls to guide the plurality of extension members into the pockets defined in the housing.

9. The air cleaner assembly of claim 8, wherein each of the extension members is provided with a guide member.

10. The air cleaner assembly of claim 8, wherein the guide members are connected together by a common structure.

11. The air cleaner assembly of claim 8, wherein the guide members are at least partially embedded into the extension members.

12. The air cleaner assembly of claim 8, wherein the guide members are formed from a material that is harder than a material used to form the extension members.

13. The air cleaner assembly of claim 11, wherein the extension members are formed from polyurethane and the guide members are formed from a material selected from the group of acrylonitrile butadiene styrene or polypropylene plastic.

14. The air cleaner assembly of claim 8, wherein the seal arrangement and the plurality of axially extending channels are disposed on a radially inward side of the open end cap.

15. The air cleaner assembly of claim 8, wherein the seal arrangement and the plurality of axially extending channels are disposed on a radially outward side of the open end cap.

* * * * *